United States Patent
Nam et al.

(10) Patent No.: US 9,948,336 B2
(45) Date of Patent: Apr. 17, 2018

(54) COMMUNICATION CIRCUIT CHIP AND ELECTRONIC DEVICE CONFIGURED TO COMMUNICATE WITH PLURAL MEMORY CARDS

(71) Applicant: Samsung Electronics Co., Ltd., Suwon-si, Gyeonggi-do (KR)

(72) Inventors: Kuang Woo Nam, Suwon-si (KR); Hyunjae Kang, Seoul (KR); Taeseon Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/292,483

(22) Filed: Oct. 13, 2016

(65) Prior Publication Data

US 2017/0126264 A1 May 4, 2017

(30) Foreign Application Priority Data

Oct. 29, 2015 (KR) .................. 10-2015-0151228

(51) Int. Cl.
*H04B 1/3816* (2015.01)
*H04B 5/00* (2006.01)

(52) U.S. Cl.
CPC ......... *H04B 1/3816* (2013.01); *H04B 5/0031* (2013.01); *H04B 5/0037* (2013.01)

(58) Field of Classification Search
CPC .................. H04B 1/3816; H04M 1/72527
USPC ....... 455/558, 550.1, 41.1, 552.1, 551, 90.1, 455/556.1, 556.2
See application file for complete search history.

(56) References Cited

U.S. PATENT DOCUMENTS

| | | | |
|---|---|---|---|
| 7,896,241 B2 * | 3/2011 | Bychkov | G06Q 20/1235 235/380 |
| 8,527,006 B2 | 9/2013 | Tat et al. | |
| 8,744,347 B2 | 6/2014 | Charrat et al. | |
| 9,143,627 B2 | 9/2015 | Tobita et al. | |
| 2007/0198795 A1 * | 8/2007 | Harada | G06F 21/121 711/164 |
| 2012/0159008 A1 * | 6/2012 | Park | G06F 13/387 710/15 |

(Continued)

FOREIGN PATENT DOCUMENTS

| | | |
|---|---|---|
| JP | 2007-235492 A | 9/2007 |
| JP | 2008-258768 A | 10/2008 |

(Continued)

*Primary Examiner* — John J Lee
(74) *Attorney, Agent, or Firm* — Harness, Dickey & Pierce, P.L.C.

(57) ABSTRACT

A communication circuit chip includes a controller, a power manager, and a memory. The controller selectively communicates, based on a reception signal that is received through an antenna, with one memory card among first and second memory cards. The power manager transfers power, in response to receiving the reception signal through the antenna, to the one memory card that is selected to communicate with the controller. The memory stores content data such that content of data stored in each of the first and second memory cards is recognized. The controller selects the one memory card that is to communicate with the controller from among the first and second memory cards, with reference to the stored content data.

18 Claims, 16 Drawing Sheets

(56) References Cited

U.S. PATENT DOCUMENTS

| | | | |
|---|---|---|---|
| 2012/0178500 A1* | 7/2012 | Hwang | H04W 8/183 |
| | | | 455/558 |
| 2012/0225621 A1* | 9/2012 | Li | H04B 1/3816 |
| | | | 455/41.1 |
| 2013/0169059 A1 | 7/2013 | Sun et al. | |
| 2014/0274210 A1* | 9/2014 | Tsai | H04B 1/3816 |
| | | | 455/558 |

FOREIGN PATENT DOCUMENTS

| | | |
|---|---|---|
| KR | 10-2005-0052967 | 6/2005 |
| KR | 10-2010-0020785 | 2/2010 |

* cited by examiner

US 9,948,336 B2

COMMUNICATION CIRCUIT CHIP AND ELECTRONIC DEVICE CONFIGURED TO COMMUNICATE WITH PLURAL MEMORY CARDS

CROSS-REFERENCE TO RELATED APPLICATIONS

The present application claims priority under 35 U.S.C. § 119 to Korean Patent Application No. 10-2015-0151228 filed on Oct. 29, 2015, in Korean Intellectual Property Office, the entire contents of which are incorporated herein by reference.

TECHNICAL FIELD

The present disclosure relates to a communication circuit and/or an electronic device including same. For example, at least some example embodiments relate to a connection and communication between electronic circuits and/or electronic devices including same.

DESCRIPTION OF THE RELATED ART

Nowadays, various electronic devices are being used. An electronic device performs functions according to operations of electronic circuits and/or electronic chips included in the electronic device. As integration of each of electronic circuits or electronic chips manufactured by a semiconductor process increases, a size of an electronic device gets smaller. In addition, portable electronic devices are widely distributed, and there are various kinds of electronic devices.

For example, a mobile communication device, a digital camera, a smart phone, a tablet computer, and a notebook computer are examples of the portable electronic devices.

Electronic devices may include a communication circuit implemented with a chip or a device. The communication circuit is used to communicate with another electronic device or system in a wired or wireless manner. For example, the electronic device may include an electronic circuit supporting a near-distance communication, such as a Bluetooth chip, a near field communication (NFC) chip, and/or the like. For another example, the electronic device may include an electronic circuit supporting a far-distance communication, such as a modulator and demodulator (MODEM) chip.

The electronic device may include a memory card. Alternatively, the electronic device may be configured to be connected with a separate memory card. The memory card stores data used to operate the electronic device or to provide a service to a user. For example, the electronic device may be connected to and communicate with a subscriber identification module (SIM) card.

The SIM card begins to be provided for electronic devices each of which supports a wireless communication in compliance with a global system for mobile communication (GSM) protocol. After a wireless communication in compliance with the third-generation mobile communication protocol, such as a code division multiple access (CDMA) protocol, is developed, the SIM card is widely being used for a wireless mobile communication device in these days. The SIM card stores subscriber information used to uniquely identify a subscriber of a wireless mobile communication service. The SIM card stores information (e.g., communication time information, charging information, and/or the like) associated with the service of a wireless mobile communication used by a user.

The electronic device may include other various electronic circuits, chips, and/or devices. Accordingly, the electronic device performs functions and provides a service to a user.

SUMMARY

The example embodiments relate to a communication circuit chip and an electronic device that is configured to communicate with a plurality of memory cards. The communication circuit chip and the electronic device according to the example embodiments may control a connection with the memory cards to communicate with a deactivated memory card.

In some example embodiments, the communication circuit chip includes a power manager configured to transfer power, based on a reception signal, to a selected memory card among first and second memory cards; a memory configured to store content data including information on data stored in the first and second memory cards; and a controller configured to, select the selected memory card based on the reception signal and the stored content data, and communicate with the selected memory card based on the reception signal.

Some example embodiments relate to an electronic device.

In some example embodiments, the electronic device includes first and second communication circuits connected to first and second memory cards, respectively; and a third communication circuit configured to transfer power, based on a reception signal received through an antenna, to a selected memory card among the first and second memory cards, wherein a first one of the first and second communication circuits is an activated communication circuit configured to transfer power to an activated memory card among the first and second memory cards, a second one of the first and second communication circuits is a deactivated communication circuit configured to not transfer power to a deactivated memory card among the first and second memory cards, and the third communication circuit is configured to transfer power to the deactivated memory card connected to the deactivated communication circuit to enable transfer of data stored in the deactivated memory card.

Some other example embodiments are also directed to an electronic device.

In some example embodiments, the electronic device includes first and second communication circuits connected to first and second memory cards, respectively, a first one of the first and second communication circuits being an activated communication circuit configured to communicate with an activated memory card among the first and second memory cards, and a second one of the first and second memory cards being a deactivated communication circuit configured to not communicate with a deactivated memory card among the first and second memory cards; and a third communication circuit configured to communicate with a selected memory card among the first and second memory cards, based on a reception signal received through an antenna such that, when an access to the deactivated memory card is requested, the third communication circuit is configured to transfer power to the deactivated memory card to communicate with the deactivated memory card.

Some other example embodiments relate to an auxiliary communication device.

In some example embodiments, the auxiliary communication device includes a memory configured to store content data including information associated with data stored in a plurality of memory cards, each of the plurality of memory cards configured to selectively receive power from a respective one of primary communication devices, if the respective one of the primary communication devices is an activated communication device; and a controller configured to establish an auxiliary link with a selected memory card of the plurality of memory cards based on a reception signal and the content data.

BRIEF DESCRIPTION OF THE DRAWINGS

The above and other objects, features, and advantages will become apparent from the following description with reference to the following figures, wherein like reference numerals refer to like parts throughout the various figures unless otherwise specified, and wherein.

DETAILED DESCRIPTION

Figure 1:
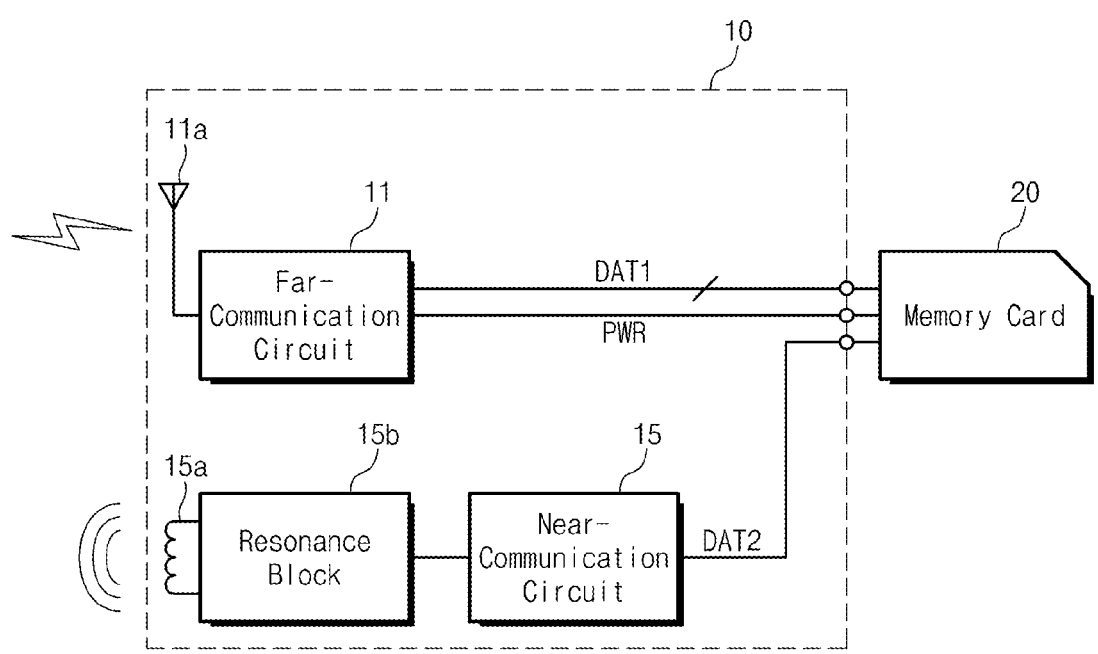
FIG. 1 is a block diagram illustrating a connection between an electronic device and a memory card.

All the above-mentioned features and the following description are provided to help better understanding of the example embodiments. That is, the example embodiments should not be construed as limited to the "example" embodiments set forth herein, and may be embodied in different forms. The following example embodiments are merely examples for fully disclosing the example embodiments, and are described to provide example embodiments of the inventive concepts to those skilled in the art. Therefore, if there are many ways to implement the components of the example embodiments, it is obvious that the example embodiments are implemented with any one of the ways or any one of the similar things thereof.

If it is mentioned that any configuration includes/comprises specific component(s) or any process includes/comprises specific operation(s) in the present disclosure, this means that other component(s) or other operation(s) may be further included. That is, the terms used herein are only intended to describe the specific example embodiments, and is not intended to limit the scope of the example embodiments. Further, the examples described to help better understanding of the present disclosure include their complementary embodiments.

The terms used herein have the meanings in which those skilled in the art would generally understand. The terms commonly used are to be construed as the consistent meanings in the context of the present disclosure. In addition, the terms used herein should not be interpreted as an overly ideal or formal sense unless explicitly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description.

However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, example embodiments will be described below with reference to the attached drawings.

FIG. 1 is a block diagram illustrating an electronic device and a memory card.

Referring to FIG. 1, an electronic device 10 may include a far-communication circuit 11 and a near-communication circuit 15. For example, the electronic device 10 may be a portable device, such as a mobile communication device, a digital camera, a smart phone, a tablet computer, or a notebook computer. The electronic device 10 may be connected and may communicate with a memory card 20.

The far-communication circuit 11 may support a far-distance communication (i.e., a communication that may be performed in a relatively long distance). For example, the far-communication circuit 11 may be configured to support a wireless mobile communication. In this example, the far-communication circuit 11 may communicate with other electronic device or system placed outside the electronic device 10, in compliance with a wireless mobile communication protocol. The far-communication circuit 11 may transmit or receive a communication signal through an antenna 11a.

For example, the far-communication circuit 11 may include a modulator/demodulator (MODEM) chip or a device similar thereto. For example, the far-communication circuit 11 may process a signal in compliance with at least one of various wireless mobile communication protocols, such as a global system for mobile communication (GSM), a code division multiple access (CDMA), a wideband CDMA (WCDMA), a high speed packet access (HSPA), an evolution-data optimized (EV-DO), a worldwide interoperability for microwave access (WiMAX), a wireless broadband (WiBro), a long term evolution (LTE), and/or the like.

The memory card 20 may store data used to operate the electronic device 10 or to provide a service to a user of the electronic device 10. For example, the memory card 20 may include a subscriber identification module (SIM) card. In this example, the memory card 20 may store subscriber information used to uniquely identify a subscriber of a wireless mobile communication service. Alternatively or additionally, the memory card 20 may store information (e.g., communication time information, charging information, and/or the like) associated with a wireless mobile communication service used by a user.

The electronic device 10 may be connected and may communicate with the memory card 20 through an external connection port. In some cases, the far-communication circuit 11 may supply power PWR to the memory card 20. In such a case, the memory card 20 may operate using the power PWR, instead of including an internal power source. The far-communication circuit 11 may exchange data DAT1 with the memory card 20. For example, the data DAT1 may include information associated with services of a wireless mobile communication processed by the far-communication circuit 11.

The near-communication circuit 15 may support a near-distance communication (i.e., a communication that is performed in a relatively short distance). For example, the near-communication circuit 15 may include a near field communication (NFC) chip or a device similar thereto. In this example, the near-communication circuit 15 may transmit or receive a communication signal through an inductive antenna 15a and a resonance block 15b.

The inductive antenna 15a may receive a signal provided from the outside of the electronic device 10. The resonance block 15b may perform impedance matching using various passive elements. The signal induced through the inductive antenna 15a may be properly transformed by the resonance block 15b, and then may be provided to the near-communication circuit 15. The signal output from the near-communication circuit 15 may be properly transformed by the resonance block 15b, and then may be output to the outside of the electronic device 10 through the inductive antenna 15a.

The near-communication circuit 15 may be connected and may communicate with the memory card 20. The near-communication circuit 15 may exchange data DAT2 with the memory card 20. For example, the memory card 20 may store information of a credit card, a coupon, and/or an identification card for a user. When the near-communication circuit 15 receives an external request, the near-communication circuit 15 may read data stored in the memory card 20 and then may output the information, for example, information of the credit card, the coupon, and/or the identification card of the user.

Figure 2:
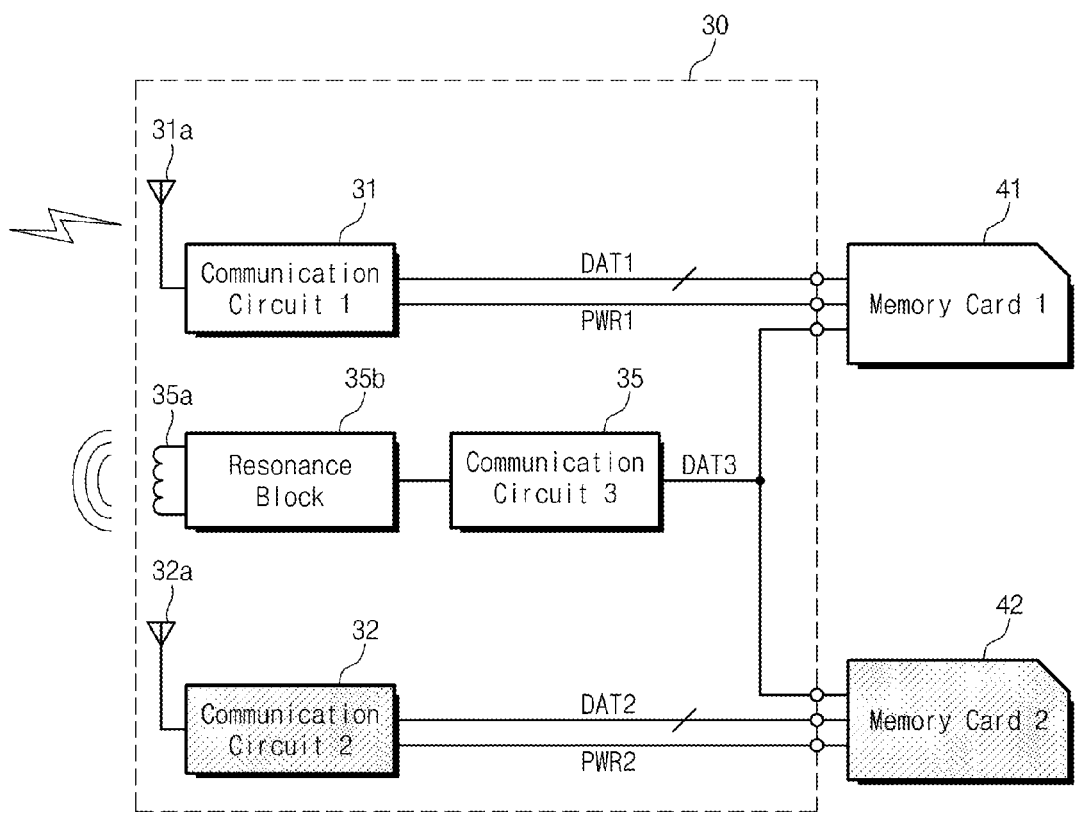
FIG. 2 is a block diagram illustrating connections between an electronic device and a plurality of memory cards.

FIG. 2 is a block diagram illustrating connections between an electronic device and a plurality of memory cards.

Referring to FIG. 2, an electronic device 30 may include a first communication circuit 31, a second communication circuit 32, and a third communication circuit 35. For example, the electronic device 30 may be a portable device, such as a mobile communication device, a digital camera, a smart phone, a tablet computer, a notebook computer, and/or the like. In some example embodiments, the electronic device 30 may be connected and may communicate with a plurality of memory cards 41 and 42.

Each of the first and second communication circuits 31 and 32 may support a far-distance communication. For example, each of the first and second communication circuits 31 and 32 may be configured to support a wireless mobile communication. In this example, each of the first and second communication circuits 31 and 32 may communicate with another electronic device or system placed outside the electronic device 30, in compliance with a wireless mobile communication protocol. The first and second communication circuits 31 and 32 may transmit or receive communication signals through antennas 31a and 32a, respectively.

For example, each of the first and second communication circuits 31 and 32 may include a MODEM chip or a device similar thereto. For example, each of the first and second communication circuits 31 and 32 may process a signal in compliance with at least one of various wireless mobile communication protocols, such as a GSM, a CDMA, a WCDMA, a HSPA, an EV-DO, a WiMAX, a WiBro, a LTE, and/or the like.

Each of the first and second memory cards 41 and 42 may store data used to operate the electronic device 30 or to provide a service to a user of the electronic device 30. For example, each of the first and second memory cards 41 and 42 may include a SIM card. In this example, each of the first and second memory cards 41 and 42 may store subscriber information used to uniquely identify a subscriber of a wireless mobile communication service. Alternatively or additionally, each of the first and second memory cards 41 and 42 may store information (e.g., communication time information, charging information, and/or the like) associated with a wireless mobile communication service used by a user.

The electronic device 30 may be connected and may communicate with the first and second memory cards 41 and 42 through an external connection port. In the example embodiment of FIG. 2, the first and second communication circuits 31 and 32 may be respectively connected with the first and second memory cards 41 and 42.

The first communication circuit 31 may transfer power PWR1 to the first memory card 41. The first communication circuit 31 may exchange data DAT1 with the first memory card 41. For example, the data DAT1 may include information associated with the service of a wireless mobile communication processed by the first communication circuit 31.

The second communication circuit 32 may transfer power PWR2 to the second memory card 42. The second communication circuit 32 may exchange data DAT2 with the second memory card 42. For example, the data DAT2 may include information associated with the service of a wireless mobile communication processed by the second communication circuit 32.

For example, the first communication circuits 31 may operate in compliance with a wireless mobile communication protocol that is different from a wireless mobile communication protocol for the second communication circuit 32. For another example, the first communication circuits 31 may operate for a wireless mobile communication service provided by a service provider that is different from a service provider of a wireless mobile communication service for the second communication circuit 32. That is, the first and second communication circuits 31 and 32 may process different communications from each other.

In the above example, the first memory card 41 may store information associated with a communication processed by the first communication circuit 31, and the second memory card 42 may store information associated with a communication processed by the second communication circuit 32. For example, the first memory card 41 may store subscriber information used to identify a subscriber of a communication performed through the first communication circuit 31 and charging information generated according to the communication performed through the first communication circuit 31. On the other hand, the second memory card 42 may store subscriber information used to identify a subscriber of a communication performed through the second communication circuit 32 and charging information generated according to the communication performed through the second communication circuit 32.

The third communication circuit 35 may support a near-distance communication. For example, the third communication circuit 35 may include a NFC chip or a device similar thereto. In this example, the third communication circuit 35 may transmit or receive a communication signal through an inductive antenna 35a and a resonance block 35b.

The inductive antenna 35a may receive a signal provided from the outside of the electronic device 30. The resonance block 35b may perform impedance matching using various passive elements. The signal induced through the inductive antenna 35a may be properly transformed by the resonance block 35b, and then may be provided to the third communication circuit 35. The signal output from the third communication circuit 35 may be properly transformed by the resonance block 35b, and then may be output to the outside of the electronic device 30 through the inductive antenna 35a.

The third communication circuit 35 may be connected and may communicate with the first and second memory cards 41 and 42. The third communication circuit 35 may exchange data DAT3 with one of the first and second memory cards 41 and 42. For example, the data DAT3 may include information of a credit card, a coupon, and/or an identification card for a user.

As illustrated in FIG. 2, when the electronic device 30 includes the plurality of communication circuits 31 and 32, one of the communication circuits 31 and 32 may be activated. For example, a user of the electronic device 30 may select and activate one of the communication circuits 31 and 32. For example, a user of the electronic device 30 may use a plurality of wireless mobile communication services, and may select one of the communication circuits 31 and 32 based on a service that the user is to use.

For another example, the electronic device 30 may select and activate one of the communication circuits 31 and 32 in response to a specific condition. For example, it may be advantageous to operate the first communication circuit 31 in a first area, but it may be advantageous to operate the second communication circuit 32 in a second area different from the first area (e.g., in view of power consumption or fee charging). In such an example, the electronic device 30 may select one of the communication circuits 31 and 32 depending on a geographic position at which the electronic device operates.

For example, the first communication circuit 31 may be selected to be activated. When the first communication circuit 31 is activated, a user may use services of a wireless mobile communication performed through the first communication circuit 31. When the first communication circuit 31 is activated, the first communication circuit 31 may transfer the power PWR1 to the first memory card 41, and may exchange the data DAT1 with the first memory card 41. On the other hand, the second communication circuit 32 may not be activated and may not operate. Accordingly, the power PWR2 may not be supplied to the second memory card 42.

In the above example, the third communication circuit 35 may communicate with the first memory card 41 to exchange data DAT3 with the first memory card 41. For example, the third communication circuit 35 may read fee charging information stored in the first memory card 41 or may provide information of a credit card from the first memory card 41 to a user.

However, because the second memory card 42 does not operate, the third communication circuit 35 may not communicate with the second memory card 42. Accordingly, even though a user requests information stored in the second memory card 42, the user may not receive the information. For example, when information of a credit card is stored in the second memory card 42, conventionally, it may be difficult for a user to pay using the credit card.

To sum up, one of the communication circuits 31 and 32 included in the electronic device 30 may be selectively activated. A memory card connected to a deactivated communication circuit may not operate. Conventionally, it may be difficult to use information stored in the non-operating memory card. In this case, the scope of services provided to a user of the electronic device 30 may be limited, and the convenience of a user may be degraded.

Figure 3:
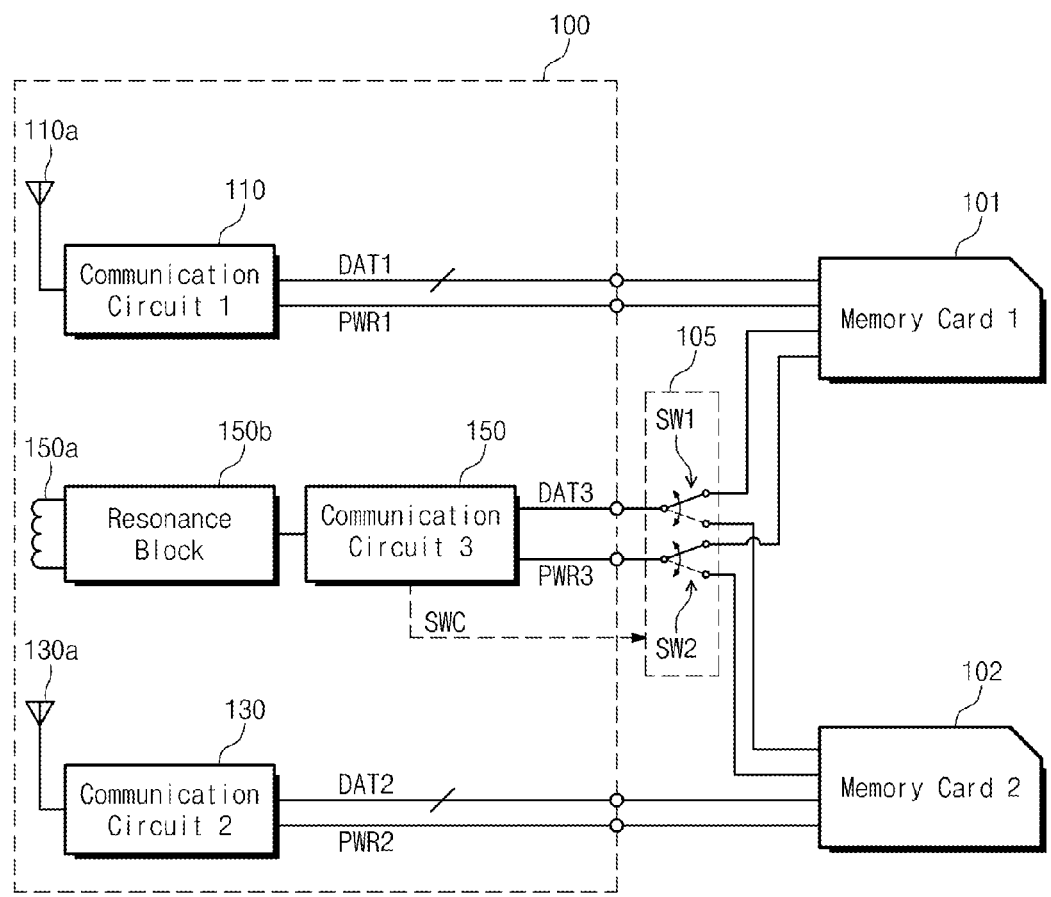
FIG. 3 is a block diagram illustrating connections between an electronic device according to the example embodiments and a plurality of memory cards.

FIG. 3 is a block diagram illustrating connections between an electronic device according to the example embodiments and a plurality of memory cards.

An electronic device 100 may include a first communication circuit 110, a second communication circuit 130, and a third communication circuit 150. For example, the electronic device 100 may be a portable device, such as a mobile communication device, a digital camera, a smart phone, a tablet, or a notebook computer, but the present disclosure is not limited thereto. The electronic device 100 may be connected and may communicate with a plurality of memory cards 101 and 102.

Each of the first and second communication circuits 110 and 130 may support a far-distance communication and may be referred to as primary communication devices. For example, each of the first and second communication circuits 110 and 130 may be configured to support a wireless mobile communication. In this example, each of the first and second communication circuits 110 and 130 may communicate with another electronic device or system placed outside the electronic device 100, in compliance with a wireless mobile communication protocol. The first and second communication circuits 110 and 130 may transmit or receive communication signals through antennas 110a and 130a, respectively.

For example, each of the first and second communication circuits 110 and 130 may include a MODEM chip or a device similar thereto. For example, each of the first and second communication circuits 110 and 130 may process a signal in compliance with at least one of various wireless mobile communication protocols, such as a GSM, a CDMA, a WCDMA, a HSPA, an EV-DO, a WiMAX, a WiBro, a LTE and/or the like. However, these examples are provided to help better understanding, and are not intended to limit the example embodiments.

Each of the first and second memory cards 101 and 102 may store data used to operate the electronic device 100 or to provide a service to a user of the electronic device 100. For example, each of the first and second memory cards 101 and 102 may include a SIM card. In this example, each of the first and second memory cards 101 and 102 may store subscriber information used to uniquely identify a subscriber of a wireless mobile communication service. Alternatively or additionally, each of the first and second memory cards 101 and 102 may store information (e.g., communication time information, charging information, and/or the like) associated with a wireless mobile communication service used by a user.

However, example embodiments are not limited to the above examples. Configurations of the first and second memory cards 101 and 102 may be variously changed or modified to store data for the electronic device 100. For example, at least one of the first memory card 101 or the second memory card 102 may be implemented with other types of cards, such as a secure digital (SD) card. In some example embodiments, at least one of the first memory card 101 or the second memory card 102 may be implemented to be embedded in the electronic device 100, such as an embedded multimedia card (eMMC).

The electronic device 100 may be connected and may communicate with the first and second memory cards 101 and 102 through an external connection port. The first communication circuit 110 may be connected and may communicate with the first memory card 101. The second communication circuit 130 may be connected and may communicate with the second memory card 102.

The first communication circuit 110 may transfer the power PWR1 to the first memory card 101. The first communication circuit 110 may exchange the data DAT1 with the first memory card 101. For example, the data DAT1 may include information associated with the service of a wireless mobile communication processed by the first communication circuit 110.

The second communication circuit 130 may transfer the power PWR2 to the second memory card 102. The second communication circuit 130 may exchange the data DAT2 with the second memory card 102. For example, the data DAT2 may include information associated with the service of a wireless mobile communication processed by the second communication circuit 130.

For example, the first communication circuit 110 may operate in compliance with a wireless mobile communication protocol that is different from a wireless mobile communication protocol for the second communication circuit 130. Alternatively, the first communication circuit 110 may operate for a wireless mobile communication service provided by a service provider that is different from a service provider of a wireless mobile communication service for the second communication circuit 130. That is, the first and second communication circuits 110 and 130 may process different communications from each other.

In the above example, the first memory card 101 may store information associated with a communication processed by the first communication circuit 110, and the second memory card 102 may store information associated with a communication processed by the second communication circuit 130. For example, the first memory card 101 may store subscriber information used to identify a subscriber of a communication performed through the first communication circuit 110 and fee charging information generated according to the communication performed through the first communication circuit 110. On the other hand, the second memory card 102 may store subscriber information used to identify a subscriber of a communication performed through the second communication circuit 130 and fee charging information generated according to the communication performed through the second communication circuit 130.

One of the plurality of communication circuits 110 and 130 may be activated such that a communication with an external device or system is performed. For example, a user of the electronic device 100 may select and activate one of the communication circuits 110 and 130. For example, a user of the electronic device 100 may use a plurality of wireless mobile communication services, and may select one of the communication circuits 110 and 130 based on a service, that the user is to use, from among the plurality of wireless mobile communication services.

For another example, the electronic device 100 may select and activate one of the communication circuits 110 and 130 in response to a specific condition. For example, it may be advantageous to operate the first communication circuit 110 in a first area, and it may be advantageous to operate the second communication circuit 130 in a second area that is different from the first area (e.g., in view of power consumption or communication service fee charging). In such an example, the electronic device 100 may select one of the communication circuits 110 and 130 depending on a geographic position at which the electronic device operates. To recognize the geographic position, the electronic device 100 may include a global positioning system (GPS) circuit or device.

An activated communication circuit may transfer power to a memory card connected to the activated communication circuit from among the first and second memory cards 101 and 102. The activated communication circuit may communicate with the memory card connected to the activated communication circuit. The memory card connected to the activated communication circuit may operate using the transferred power. The activated communication circuit may store communication use data (e.g., data of communication time, data of charging information, and/or the like), that is generated according to communication with an external device or system, in the memory card connected to the activated communication circuit.

On the other hand, a deactivated communication circuit may not transfer power to a memory card connected to the deactivated communication circuit from among the first and second memory cards 101 and 102. The deactivated communication circuit may not communicate with the memory card connected to the deactivated communication circuit.

The third communication circuit 150 may support a near-distance communication and may be referred to as an auxiliary communication device. For example, the third communication circuit 150 may include a NFC chip or a device similar thereto. In this example, the third communication circuit 150 may transmit or receive a communication signal through an inductive antenna 150a and a resonance block 150b.

The inductive antenna 150a may receive a signal provided from the outside of the electronic device 100. The resonance block 150b may perform impedance matching using various passive elements. The signal induced through the inductive antenna 150a may be properly transformed by the resonance block 150b, and then may be provided to the third communication circuit 150. The signal output from the third communication circuit 150 may be properly transformed by the resonance block 150b, and then may be output to the outside of the electronic device 100 through the inductive antenna 150a.

However, example embodiments are not limited to the above examples. The third communication circuit 150 may be configured to perform various other types of near-distance communications. For example, the third communication circuit 150 may be configured to process a signal in compliance with other near-distance communication protocols, such as Bluetooth, wireless fidelity (WiFi), radio frequency identification (RFID), and/or the like.

The third communication circuit 150 may be connected and may communicate with one of the first and second memory cards 101 and 102. A switch circuit 105 may be provided between the third communication circuit 150 and the first and second memory cards 101 and 102. The switch circuit 105 may provide a connection between the third communication circuit 150 and the first memory card 101 or between the third communication circuit 150 and the second memory card 102.

For example, the switch circuit 105 may include switches SW1 and SW2. The third communication circuit 150 may be connected to the first memory card 101 or the second memory card 102, according to an operation of the switch circuit 105. While FIG. 3 illustrates that the switch circuit 105 includes switch elements, the switch elements may be replaced with other elements to control the connection. For example, the switch circuit 105 may include a transistor, a buffer circuit, a gate circuit, and/or the like, instead of a switch element.

The third communication circuit 150 may output a switch control signal SWC to control the operation of the switch circuit 105. The switch circuit 105 may connect the third communication circuit 150 to one of the first memory card 101 and the second memory card 102 in response to the switch control signal SWC.

The third communication circuit 150 may output the switch control signal SWC based on a reception signal received through the inductive antenna 150a. The reception signal may be transmitted from an external device or system of the electronic device 100. The reception signal may include an access request to data stored in one of the first memory card 101 and the second memory card 102.

When the reception signal includes an access request to data stored in the first memory card 101, the switch circuit 105 may connect the third communication circuit 150 to the first memory card 101 in response to the switch control signal SWC. When the reception signal includes an access request to data stored in the second memory card 102, the switch circuit 105 may connect the third communication circuit 150 to the second memory card 102 in response to the switch control signal SWC.

The third communication circuit 150 may communicate with a memory card connected with the third communication circuit 150 through the switch circuit 105. The third communication circuit 150 may exchange data DAT3 with the memory card connected through the switch circuit 105. For example, the data DAT3 may include information of a credit card, a coupon, an identification card, and/or the like, for a user. For example, the third communication circuit 150 may communicate with the first and second memory cards 101 and 102 in compliance with a single wire protocol (SWP), but example embodiments are not limited thereto.

The third communication circuit 150 may communicate with one of the first and second memory cards 101 and 102 based on the reception signal received through the inductive antenna 150a. The third communication circuit 150 may output information requested based on the reception signal to an external device or system. For example, the third communication circuit 150 may read charging information stored in one of the first and second memory cards 101 and 102, or may provide information of the credit card from one of the first and second memory cards 101 and 102 to a user.

The third communication circuit 150 may transfer power PWR3 to the memory card connected with the third communication circuit 150 through the switch circuit 105. For example, the third communication circuit 150 may transfer the power PWR3 based on the reception signal received through the inductive antenna 150a. The power PWR3 may be supplied based on a current generated by the reception signal.

As described above, one of the communication circuits 110 and 130 may be activated. A memory card that is connected to the activated communication circuit from among the first and second memory cards 101 and 102 may receive the power from the activated communication circuit. When the reception signal includes the access request to the data stored in the memory card connected to the activated communication circuit, the third communication circuit 150 may communicate with the memory card connected to the activated communication circuit through the switch SW1, without the power PWR3 being supplied.

On the other hand, a memory card that is connected to the deactivated communication circuit from among the first and second memory cards 101 and 102 may not receive the power from the deactivated communication circuit. Accordingly, to read the data stored in the memory card connected to the deactivated communication circuit, the memory card connected to the deactivated communication circuit may receive separate power (i.e., the power PWR3).

When the reception signal includes the access request to the data stored in the memory card connected to the deactivated communication circuit, the third communication circuit 150 may transfer the power PWR3 to the memory card connected to the deactivated communication circuit through the switch SW2. Accordingly, the third communication circuit 150 may communicate with the memory card connected to the deactivated communication circuit, and the data DAT3 stored in the memory card connected to the deactivated communication circuit may be read and output.

The memory card connected to the deactivated communication circuit may not operate during normal operation. However, in the example embodiments, the third communication circuit 150 may control the switch circuit 105 and may transfer the power PWR3 to the memory card connected to the deactivated communication circuit, and thus the third communication circuit 150 may exchange the data DAT3 with the memory card connected to the deactivated communication circuit through the switch circuit 105. Accordingly, the data stored in the memory card connected to the deactivated communication circuit may be read. As a result, the scope of services provided to a user of the electronic device 100 may be expanded, and the convenience of a user may be improved.

As described above, the third communication circuit 150 may generate the switch control signal SWC to control the switch circuit 105. To control the switch circuit 105, the third communication circuit 150 may collect "content data". The content data may include information associated with "content" of data stored in each of the first memory card 101 and the second memory card 102.

For example, the third communication circuit 150 may recognize which data is stored in each of the first memory card 101 and the second memory card 102, based on the content data. Based on the content data, the third communication circuit 150 may determine a memory card that stores data requested based on the reception signal received through the inductive antenna 150a, from among the first memory card 101 and the second memory card 102. The third communication circuit 150 may select one memory card that is to communicate with the third communication circuit 150 from among the first and second memory cards 101 and 102, with reference to the content data. The third communication circuit 150 may control the switch circuit 105 to communicate with the determined memory card.

When an operation of the electronic device 100 is initiated after the electronic device 100 is powered on, operations of components included in the electronic device 100 may be initialized. For example, connections between the first to third communication circuits 110, 130, and 150 and the first and second memory cards 101 and 102 may be initialized. While the connections are initialized, for example, each of the first to third communication circuits 110, 130, and 150, and the first and second memory cards 101 and 102 may test whether a line connection, an operation status, and/or a communication condition is normal.

In some example embodiments, when initializing connections with the first and second memory cards 101 and 102, the third communication circuit 150 may collect the "content data". During the initialization operation, the third communication circuit 150 may recognize in advance which data is stored in each of the first memory card 101 and the second memory card 102. The content data may be stored in a memory included in the third communication circuit 150. The stored content data may be referred to control the switch circuit 105.

Figure 4:
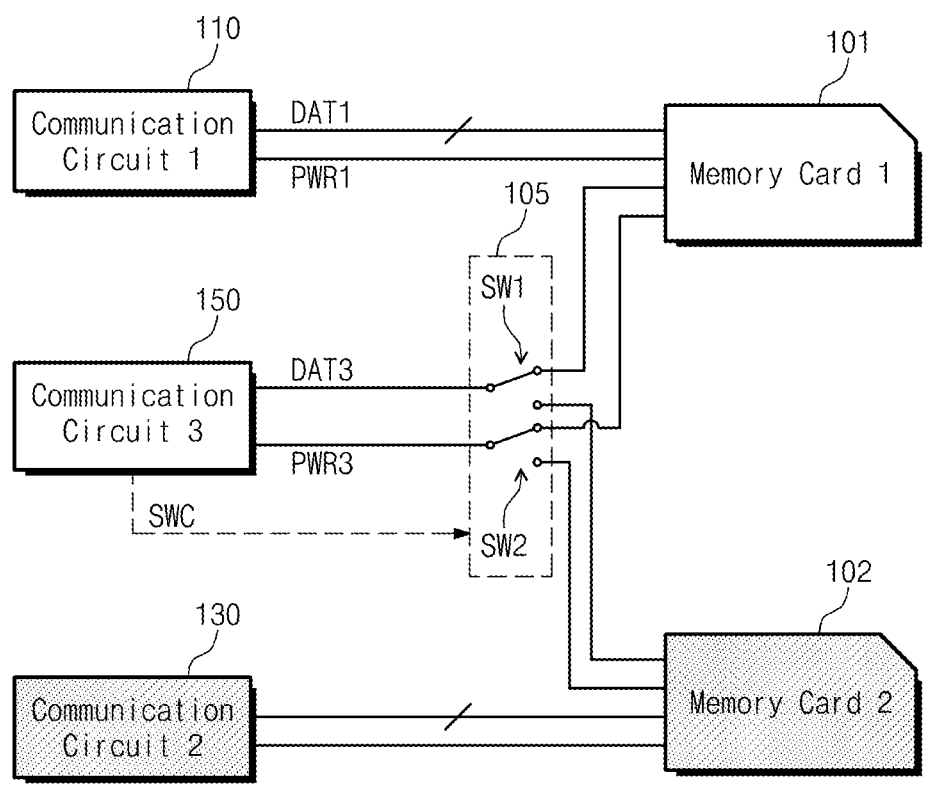
FIG. 4 is a block diagram illustrating a connection between an electronic device and a memory card connected to an activated communication circuit in FIG. 3.

FIG. 4 is a block diagram illustrating a connection between an electronic device and a memory card connected to an activated communication circuit in FIG. 3.

Referring to FIG. 4, in FIG. 4 it will be assumed that the first communication circuit 110 is activated to communicate with an external device or system and the second communication circuit 130 is deactivated. However, this is merely an example, and, instead, the second communication circuit 130 may be activated.

The first communication circuit 110 may be connected to the first memory card 101. The first communication circuit 110 may transfer the power PWR1 to the first memory card 101. The first communication circuit 110 may communicate with the first memory card 101 to exchange the data DAT1 with the first memory card 101.

The second communication circuit 130 may be connected to the second memory card 102. However, the second communication circuit 130 may not transfer power to the second memory card 102. The second communication circuit 130 may not communicate with the second memory card 102.

As described with reference to FIG. 3, when initializing connections with the first and second memory cards 101 and 102, the third communication circuit 150 may store content data. In some cases, the third communication circuit 150 may receive a reception signal including an access request to data stored in the first memory card 101, through the inductive antenna 150a of FIG. 3. The third communication circuit 150 may determine to communicate with the first memory card 101 with reference to the content data.

The third communication circuit 150 may output the switch control signal SWC to control an operation of the switch circuit 105. The switch circuit 105 may connect the first memory card 101 with the third communication circuit 150 in response to the switch control signal SWC. Accordingly, the third communication circuit 150 may read the data DAT3 stored in the first memory card 101, through the switch SW1. The third communication circuit 150 may output a signal corresponding to the data DAT3 to provide the read data DAT3 to a user.

In some cases, the switch SW2 may connect the first memory card 101 with the third communication circuit 150 to supply the power PWR3 to the first memory card 101. However, the first memory card 101 may receive the power PWR1 from the activated first communication circuit 110. Accordingly, in some other cases, the switch SW2 may not be controlled to connect the first memory card 101 with the third communication circuit 150.

Figure 5:
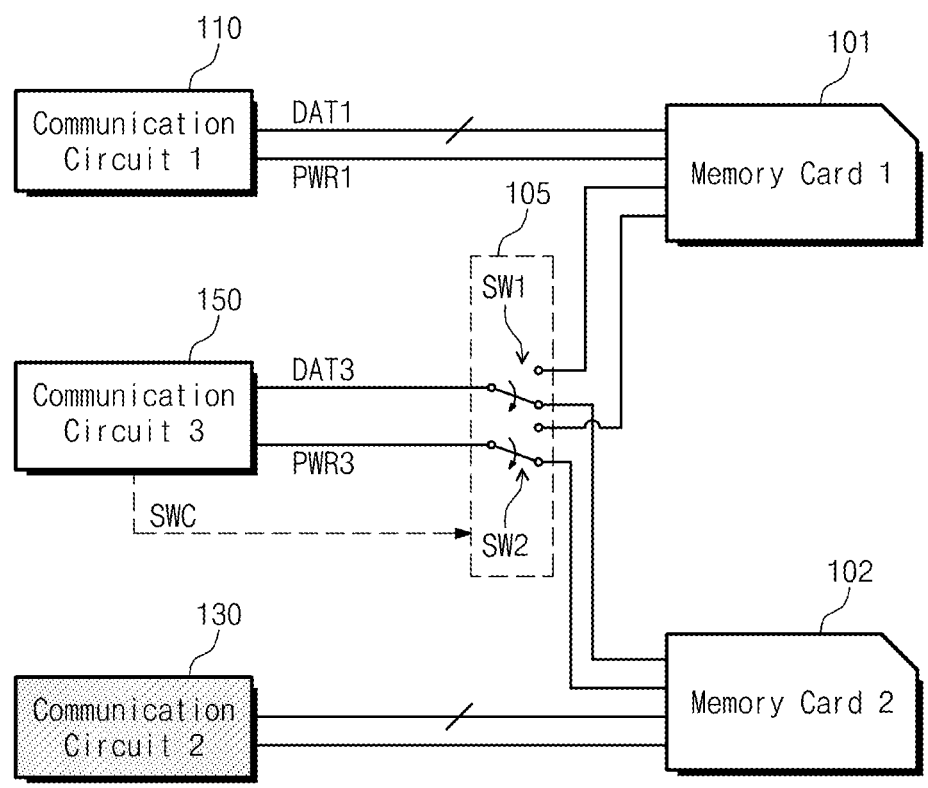
FIG. 5 is a block diagram illustrating a connection between an electronic device and a memory card connected to a deactivated communication circuit in FIG. 3.

FIG. 5 is a block diagram illustrating a connection between an electronic device and a memory card connected to a deactivated communication circuit in FIG. 3.

Referring to FIG. 5, in FIG. 5 it will be assumed that the first communication circuit 110 is activated to communicate with an external device or system and the second communication circuit 130 is deactivated. However, this is merely an example, and, instead, the second communication circuit 130 may be activated.

The first communication circuit 110 may be connected to the first memory card 101. The first communication circuit 110 may transfer the power PWR1 to the first memory card 101. The first communication circuit 110 may communicate with the first memory card 101 to exchange the data DAT1 with the first memory card 101.

The second communication circuit 130 may be connected to the second memory card 102. However, the second communication circuit 130 may not supply the power to the second memory card 102. The second communication circuit 130 may not communicate with the second memory card 102.

As described with reference to FIG. 3, when initializing connections with the first and second memory cards 101 and 102, the third communication circuit 150 may store content data. In some cases, the third communication circuit 150 may receive a reception signal including an access request to the data stored in the second memory card 102, through the inductive antenna 150a of FIG. 3. The third communication circuit 150 may determine to communicate with the second memory card 102 with reference to the content data.

However, the second memory card 102 may not receive power from the second communication circuit 130. Accordingly, to access the data stored in the second memory card 102, the third communication circuit 150 may transfer the power PWR3 to the second memory card 102. The second communication circuit 102 may operate using the power PWR3.

The third communication circuit 150 may output the switch control signal SWC to control an operation of the switch circuit 105. The switch circuit 105 may connect the second memory card 102 with the third communication circuit 150 in response to the switch control signal SWC. The switch SW2 may connect the second memory card 102 with the third communication circuit 150 to transfer the power PWR3 to the second memory card 102.

The third communication circuit 150 may read the data DAT3 stored in the second memory card 102, through the switch SW1. The third communication circuit 150 may output a signal corresponding to the data DAT3 to provide the read data DAT3 to a user.

When the switch circuit 105 is not provided, the second memory card 102 connected to the deactivated second communication circuit 130 may not operate. Thus, it may be difficult to use information stored in the second memory card 102. For example, when information of a credit card that a user is to use is only stored in the second memory card 102, the user may not easily use the credit card.

However, in the example embodiments, the third communication circuit 150 may collect information associated with content of data stored in each of the first and second memory cards 101 and 102, and may control the switch circuit 105 based on the collected information. Accordingly, it may be possible to use information stored in the second memory card 102. As a result, the scope of services provided to a user of an electronic device may be expanded, and the convenience of a user may be improved.

Figure 6:
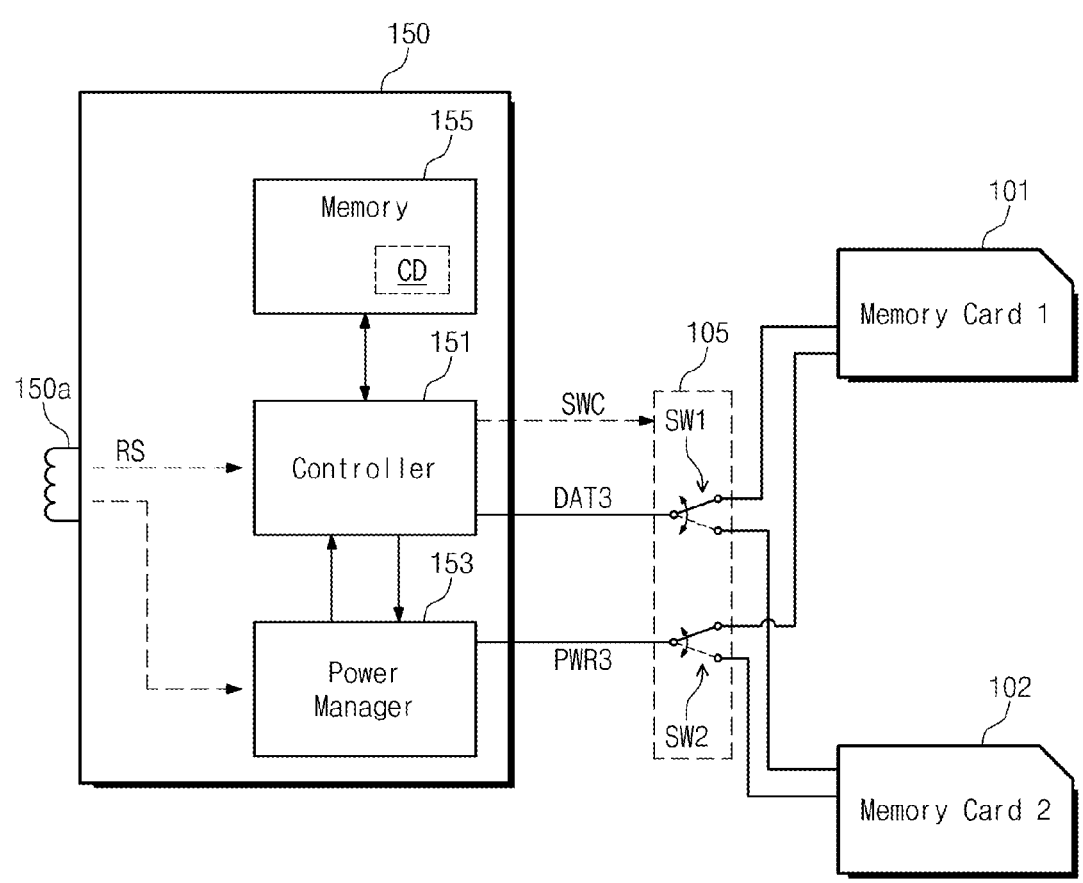
FIG. 6 is a block diagram illustrating an example configuration of a third communication circuit of FIG. 3.

FIG. 6 is a block diagram illustrating an example configuration of a third communication circuit of FIG. 3.

Referring to FIG. 6, the third communication circuit 150 may include a controller 151, a power manager 153, and a memory 155.

The controller 151 may include at least one processor implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The controller 151 is programmed with instructions that configure the one or more processors as special purpose processors to control the overall operations of the third communication circuit 150. For example, the processor may be configured to establish an auxiliary link between the third communication circuit 150 and a selected one of the plurality of memory cards based on a reception signal RS such that the selected memory card is accessible irrespective of whether a respective one of the first and second communication circuits connected to the selected memory card is activated to provide the power to the selected memory card.

For example, the controller 151 may output the switch control signal SWC. The switch control signal SWC may be generated to control the switch circuit 105. The switch circuit 105 may connect the controller 151 with one of the first memory card 101 and the second memory card 102 in response to the switch control signal SWC. The controller 151 may exchange the data DAT3 with a memory card connected with the controller 151 through the switch SW1.

The inductive antenna 150a may receive a reception signal RS from an external device or system. The reception signal RS may include an access request to data stored in one of the first memory card 101 and the second memory card 102. The controller 151 may generate the switch control signal SWC based on the reception signal RS. Accordingly, the controller 151 may selectively communicate with one of the first memory card 101 and the second memory card 102 based on the reception signal RS.

The power manager 153 may supply the power PWR3 to a memory card selected to communicate with the controller 151. The power manager 153 may operate according to control of the controller 151. The switch SW2 may be controlled to transfer the power PWR3 to the selected memory card. In some example embodiments, the power manager 153 may provide power used to operate the controller 151 to the controller 151.

The power manager 153 may supply the power PWR3 based on the reception signal RS that is received through the inductive antenna 150a. The power PWR3 may be supplied based on a current generated by the reception signal RS. For example, the power manager 153 may include a power-related circuit such as a rectifier, a regulator, and/or the like, to stabilize and convert a level of the reception signal RS.

The memory 155 may store data used in an operation of the third communication circuit 150. For example, the memory 155 may store data processed or to be processed by the processor of the controller 151. For example, the memory 155 may store instruction codes of firmware/software that is driven or executed to operate the third communication circuit 150. The memory 155 may include a volatile memory, such as a static random access memory (SRAM), a dynamic RAM (DRAM), a synchronous DRAM (SDRAM), and/or the like, and/or a nonvolatile memory, such as a flash memory, a phase-change RAM (PRAM), a magneto-resistive RAM (MRAM), a resistive RAM (Re-RAM), a ferro-electric RAM (FRAM).

The memory 155 may store content data CD. The content data CD may include information associated with content of data stored in each of the first and second memory cards 101 and 102. The controller 151 may recognize the content of data stored in each of the first memory card 101 and the second memory card 102 based on the content data CD.

The controller 151 may select one memory card that is to communicate with the controller 151 from among the first and second memory cards 101 and 102, with reference to the content data CD. The controller 151 may control the switch circuit 105 by means of the switch control signal SWC to communicate with the memory card selected with reference to the content data CD. Accordingly, the controller 151 may communicate with the memory card that stores the data requested based on the reception signal RS.

In some example embodiments, when initializing connections with the first and second memory cards 101 and 102, the controller 151 may collect the content data CD. Accordingly, the memory 155 may store the content data CD. However, example embodiments are not limited thereto. In some example embodiments, the content data CD may be periodically collected according to control of the controller 151, or may be collected in response to a specific condition being satisfied. For example, the content data CD may be collected in response to a command provided from the outside of the third communication circuit 150. Collecting the content data CD may be variously changed or modified.

Figure 7:
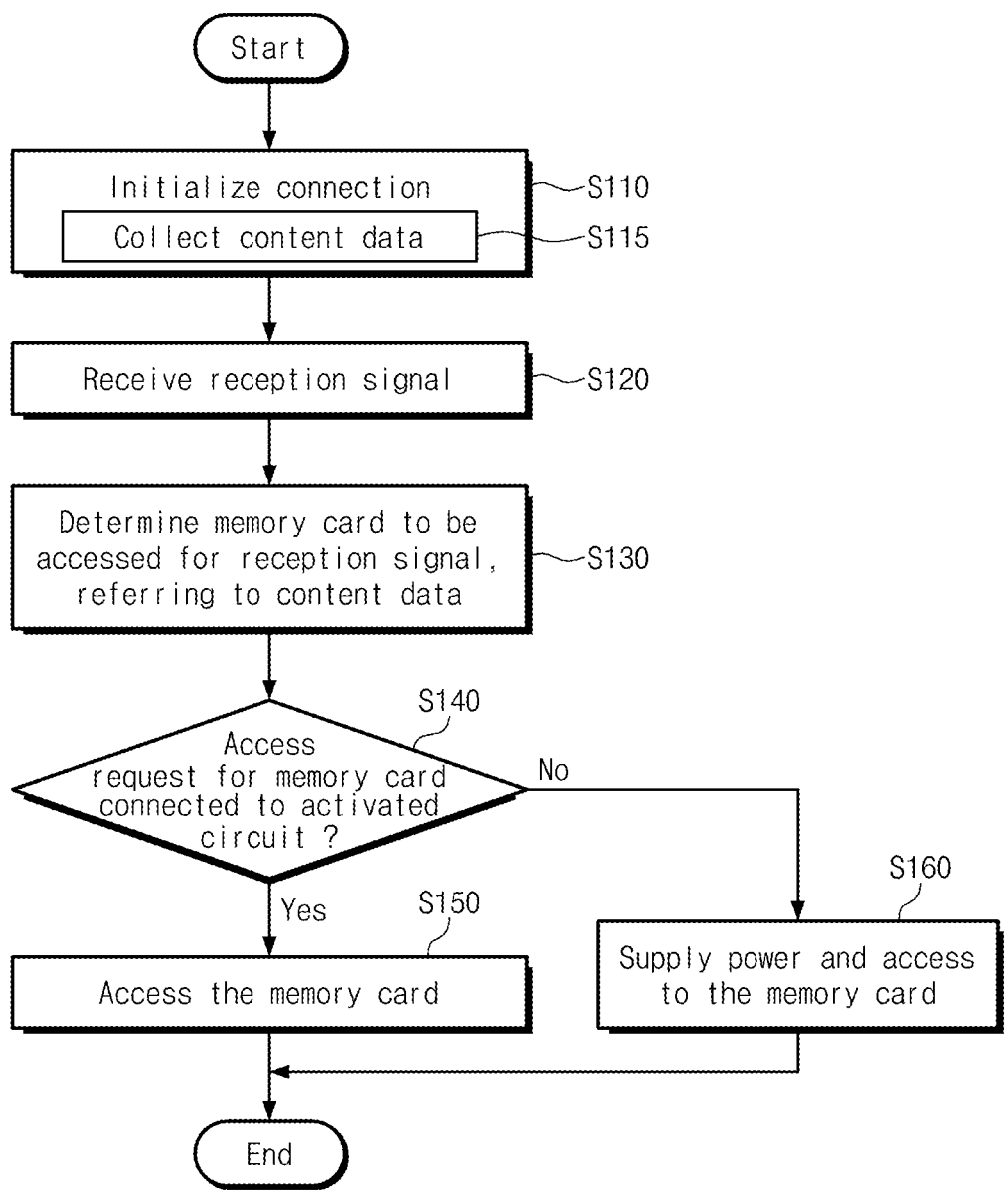
FIG. 7 is a flowchart describing an example operation of a third communication circuit of FIG. 3.

FIG. 7 is a flowchart describing an example operation of a third communication circuit of FIG. 3.

Referring to FIGS. 3, 6 and 7, in operation S110, when an operation of the electronic device 100 is initiated after the electronic device 100 is powered on, operations of components included in the electronic device 100 may be initialized.

For example, connections between the third communication circuit 150 and the first and second memory cards 101 and 102 may be initialized. While the connections are initialized, the third communication circuit 150 may test whether a line connection, an operation status, and/or a communication environment for the connection with the first and second memory cards 101 and 102 are normal. For example, the controller 151 may control the initialization operation in overall.

In operation S115, when initializing the connections with the first and second memory cards 101 and 102, the controller 151 of the third communication circuit 150 may collect the content data CD. The third communication circuit 150 may recognize which data is stored in each of the first memory card 101 and the second memory card 102, based on the content data CD. The content data CD may be stored in the memory 155. The content data CD may be referred to control the switch circuit 105.

In operation S120, the third communication circuit 150 may receive the reception signal RS through the inductive antenna 150a.

In operation S130, the controller 151 of the third communication circuit 150 may determine whether data requested based on the received signal RS is stored in the first memory card 101 or the second memory card 102. In some example embodiments, the controller 151 of the third communication circuit 150 may select a memory card that is to be accessed for the reception signal RS, with reference to the content data CD.

In operation S140, the third communication circuit 150 may determine whether the memory card to be accessed for the reception signal RS is connected to an activated communication circuit, under control of the controller 151. In some example embodiments, the third communication circuit 150 may monitor whether the communication circuits 110 and 130 transfer power to the memory cards 101 and 102 respectively. For example, when a specific communication circuit transfers power to a specific memory card, the third communication circuit 150 may determine the specific memory card as being connected to an activated communication circuit. On the other hand, when a specific communication circuit does not transfer power to a specific memory card, the third communication circuit 150 may determine the specific memory card as being connected to a deactivated communication circuit.

In some example embodiments, the third communication circuit 150 may transmit a test signal to each of the memory cards 101 and 102. For example, when a specific memory card responds to the test signal, the third communication circuit 150 may determine the specific memory card as being connected to an activated communication circuit. On the other hand, when a specific memory card does not respond to the test signal, the third communication circuit 150 may determine the specific memory card as being connected to a deactivated communication circuit. Example embodiments are not limited to the above example embodiments, and the implementation of operation S140 may be variously changed or modified.

When a target memory card to be accessed for the reception signal RS is determined as being connected to an activated communication circuit in operation S140, operation S150 may be performed.

In operation S150, the third communication circuit 150 may access the target memory card through the switch circuit 105 (refer to FIG. 4). For example, the target memory card may receive power from the activated communication circuit, and the third communication circuit 150 may exchange the data DAT3 with the target memory card through the switch circuit 105.

On the other hand, when the target memory card is determined as being connected to a deactivated communication circuit in operation S140, operation S160 may be performed.

In operation S160, the third communication circuit 150 may access the target memory card through the switch circuit 105. For example, because the target memory card may not receive power from the deactivated communication circuit, in addition to exchanging data DAT3 through the switch circuit 105, the third communication circuit 150 may transfer the power PWR3 to the target memory card through the switch circuit 105 (refer to FIG. 5). Accordingly, the third communication circuit 150 may exchange the data DAT3 with the target memory card even though the target memory card is connected to a deactivated communication circuit.

Figure 8:
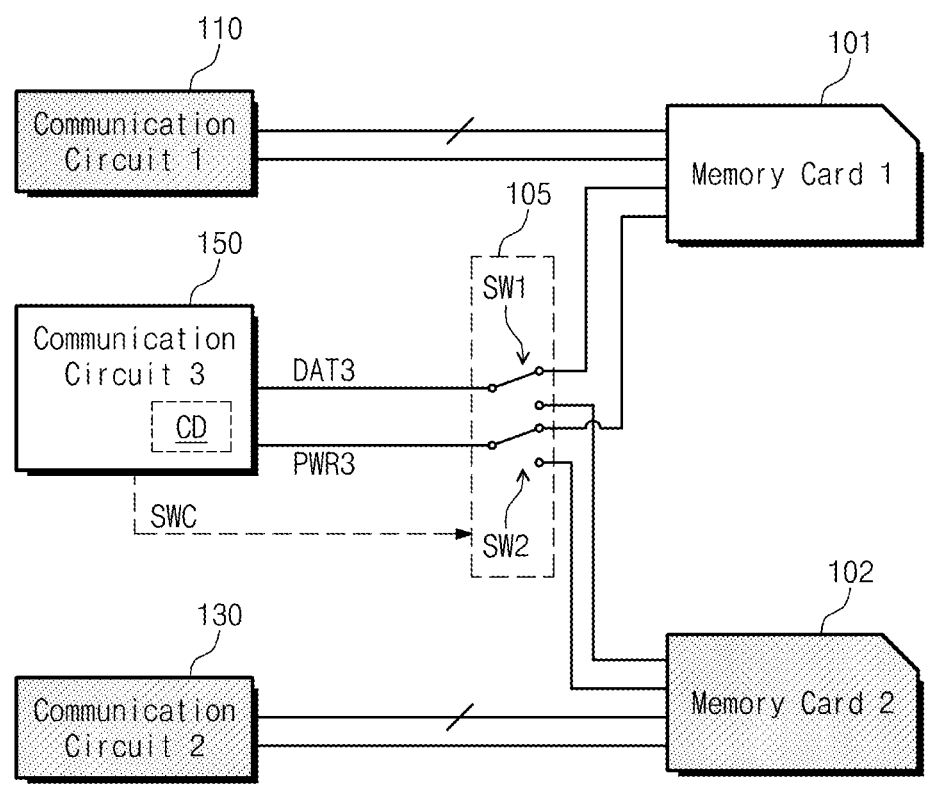
FIG. 8 is a block diagram illustrating a connection between a third communication circuit and a memory card in FIG. 3 when an electronic device of FIG. 3 is not powered.

FIG. 8 is a block diagram illustrating a connection between a third communication circuit and a memory card in FIG. 3 when an electronic device of FIG. 3 is not powered.

Referring to FIGS. 3, 6 and 8, in some cases, the electronic device 100 may not receive power. In this case, the electronic device 100 may be powered off. When the electronic device 100 is powered off, both the first and second communication circuits 110 and 130 may not be activated. The first and second memory cards 101 and 102 may not receive power from the first and second communication circuits 110 and 130 respectively.

Meanwhile, even though the electronic device 100 is powered off, the reception signal RS may be transmitted to the third communication circuit 150. The reception signal RS received through the inductive antenna 150*a* may allow a current to flow in the electronic device 100. The power manager 153 of the communication circuit 150 may temporarily operate the third communication circuit 150 based on the current generated by the reception signal RS.

The reception signal RS may include an access request to data stored in one of the first memory card 101 and the second memory card 102. The controller 151 of the third communication circuit 150 may determine whether the data requested based on the received signal RS is stored in the first memory card 101 or the first memory card 102, with reference to the content data CD. The controller 151 may generate a switch control signal SWC to control an operation of the switch circuit 105 based on the determined result.

For example, the controller 151 may determine that the data requested based on the reception signal RS is stored in the first memory card 101, with reference to the content data CD. In this example, the controller 151 may control the switch circuit 105 to connect the third communication circuit 150 to the first memory card 101. Accordingly, the power PWR3 may be transferred to the first memory card 101 through the switch SW2, and the first memory card 101 may operate using the power PWR3. Furthermore, the third communication circuit 150 may exchange the data DAT3 with the first memory card 101.

The third communication circuit 150 may output the data that is requested based on the reception signal RS, based on the data DAT3. The third communication circuit 150 may output a signal corresponding to the data requested based on the reception signal RS through the inductive antenna 150*a*.

In the above example, it has been described that a communication with the first memory card 101 is performed. However, for another example, when it is determined that the data requested based on the reception signal RS is stored in the second memory card 102, the third communication circuit 150 may control the switch circuit 105 to communicate with the second memory card 102. In such an example, the power PWR3 may be transferred to the second memory card 102 to operate the second memory card 102.

As described with reference to FIG. 8, the third communication circuit 150 may select a memory card that is to communicate with the third communication circuit 150, with reference to the content data CD. The third communication circuit 150 may transfer the power PWR3 to the selected memory card, and may read data stored in the selected memory card. Accordingly, in the example embodiments, even though a specific memory card does not receive power, the third communication circuit 150 may control the switch circuit 105 to transfer the power PWR3 to the specific memory card, and thus the third communication circuit 150 may read the data DAT3. To this end, each of the third communication circuit 150, the first memory card 101, and the second memory card 102 may be configured to operate using a small amount of power.

Figure 9:
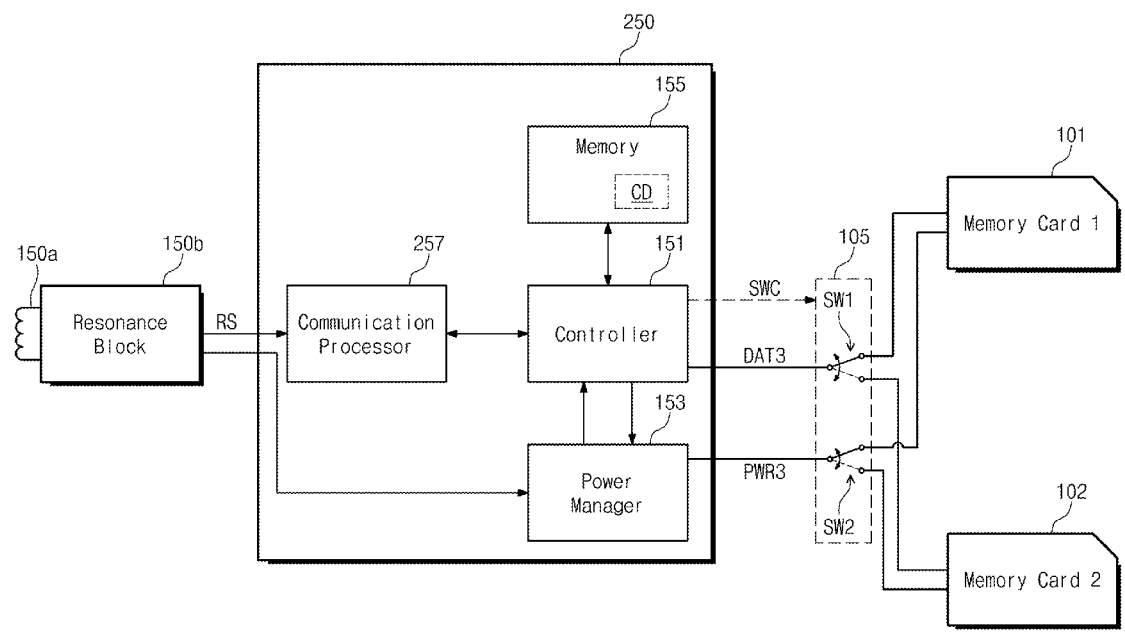
FIG. 9 is a block diagram illustrating an example configuration of a third communication circuit of FIG. 3.

FIG. 9 is a block diagram illustrating an example configuration of a third communication circuit of FIG. 3 according to another example embodiment.

Referring to FIG. 9, a third communication circuit 250 may include a controller 151, a power manager 153, a memory 155, and a communication processor 257.

The third communication circuit 250 may communicate with one of the first and second memory cards 101 and 102 through the switch circuit 105. Configurations and operations of the controller 151, the power manager 153, the memory 155, and the switch circuit 105 have been described with reference to FIGS. 3 to 8, thus redundant descriptions will be omitted below for brevity.

The third communication circuit 250 may receive the reception signal RS through the inductive antenna 150*a*. The resonance block 150*b* may perform impedance matching using various passive elements, between the inductive antenna 150*a* and the third communication circuit 250. The signal induced through the inductive antenna 150*a* may be properly transformed by the resonance block 150*b*, and then may be provided to the third communication circuit 250. The signal output from the third communication circuit 250 may be properly transformed by the resonance block 150*b*, and then may be output to the outside of the third communication circuit 250 through the inductive antenna 150*a*.

The communication processor 257 may process the reception signal RS, and may provide the processed signal to the controller 151. Alternatively, the communication processor 257 may process a signal corresponding to data provided from the controller 151, and may provide the processed signal to the resonance block 150*b* such that the signal processed by the communication processor 257 may be output through the inductive antenna 150*a*.

The communication processor 257 may properly process signals to perform near-distance wireless communication. For example, the communication processor 257 may include a demodulator for demodulating the reception signal RS. For example, the communication processor 257 may include a modulator for modulating the signal corresponding to the data provided from the controller 151. Example embodiments are not limited to the above example, and the communication processor 257 may be variously changed or modified to perform a communication-related operation.

Figure 10:
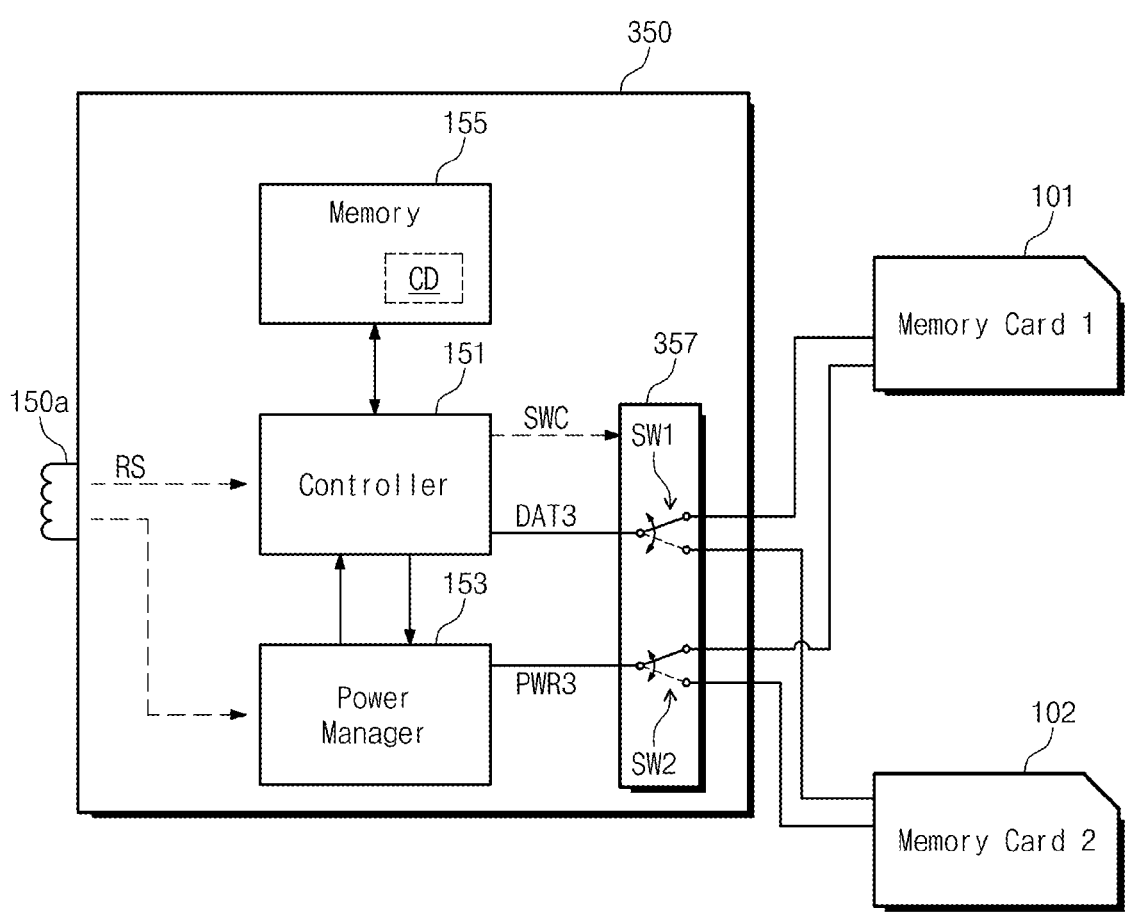
FIG. 10 is a block diagram illustrating an example configuration of a third communication circuit of FIG. 3.

FIG. 10 is a block diagram illustrating an example configuration of a third communication circuit of FIG. 3 according to another example embodiment.

For example, a third communication circuit 350 may include a controller 151, a power manager 153, a memory 155, and a switch circuit 357.

Configurations and operations of the controller 151, the power manager 153, and the memory 155 have been described with reference to FIGS. 3 to 8, thus redundant descriptions will be omitted below for brevity.

The switch circuit 105 illustrated in FIGS. 3 to 8 may be provided separately from the third communication circuit 150. On the other hand, in some example embodiment, the switch circuit 357 may be included in the third communication circuit 350. The controller 151 of the third communication circuit 350 may communicate with one of the first and second memory cards 101 and 102 through the switch circuit 357. The switch circuit 357 may connect the controller 151 to one of the first memory card 101 and the second memory card 102 under control of the controller 151.

The controller 151 may control the switch circuit 357 to access a memory card that stores data requested based on the reception signal RS through the inductive antenna 150*a*. The controller 151 may select a memory card that is to be accessed for the received signal RS, with reference to the content data CD. The controller 151 may control the switch circuit 357 by means of the switch control signal SWC. The controller 151 may communicate with a memory card connected with the controller 151 through the switch circuit 357.

Configurations and operations of the switch circuit 357 may be the substantially same as or similar to those of the switch circuit 105 illustrated with reference to FIGS. 3 to 8. For brevity, detailed descriptions for the switch circuit 357 will be omitted below.

Figure 11:
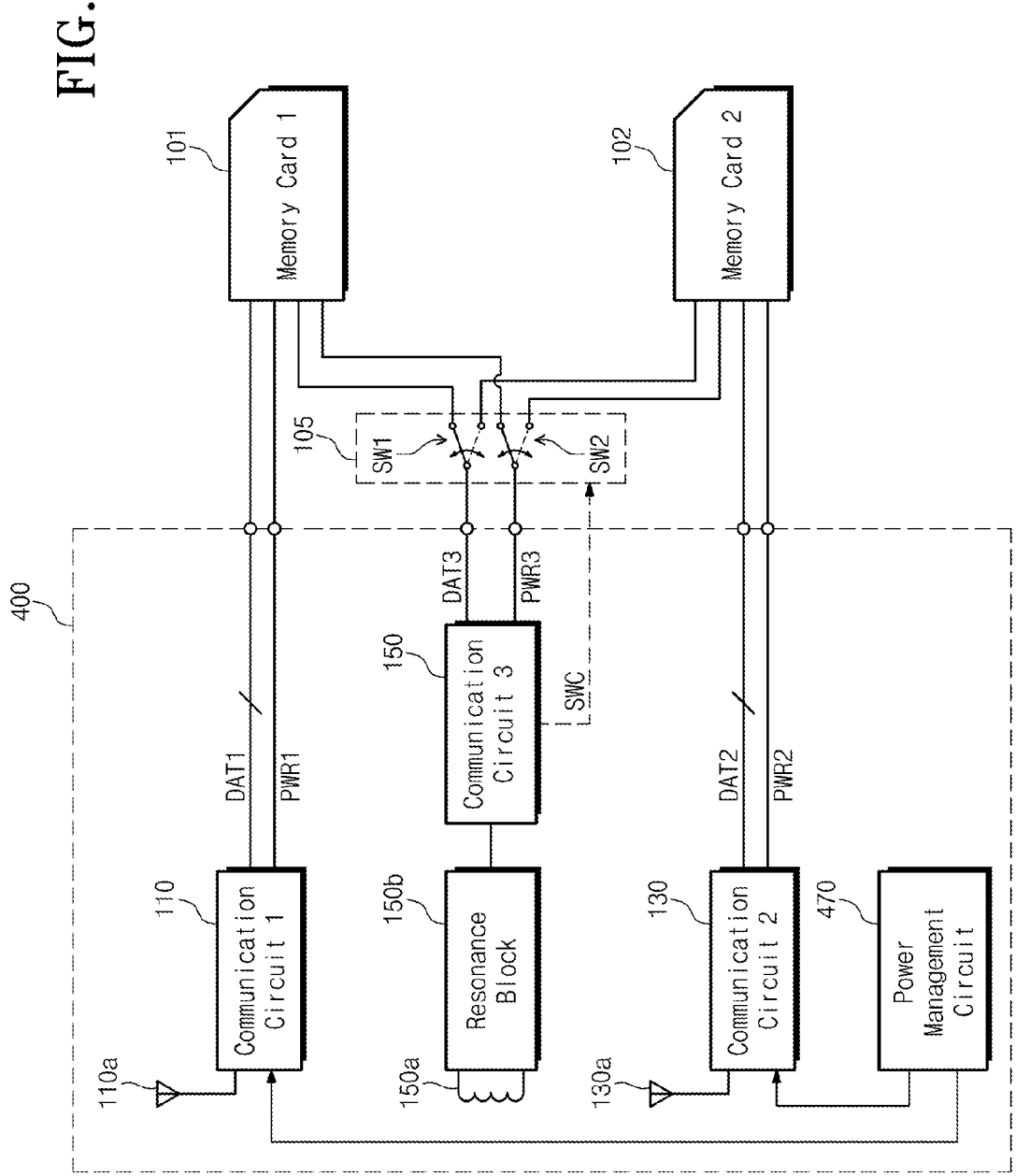
FIG. 11 is a block diagram illustrating an example configuration of an electronic device.

FIG. 11 is a block diagram illustrating an example configuration of an electronic device according to another example embodiment.

Referring to FIG. 11, an electronic device 400 may include a first communication circuit 110, a second communication circuit 130, a third communication circuit 150, and a power management circuit 470.

The electronic device 400 may be connected and may communicate with a plurality of memory cards 101 and 102 through the switch circuit 105. Configurations and operations of the first communication circuit 110, the second communication circuit 130, the antennas 110*a* and 130*a*, the third communication circuit 150, the inductive antenna 150*a*, the resonance block 150*b*, and the switch circuit 105 have been described with reference to FIGS. 3 to 8, thus redundant descriptions will be omitted below for brevity.

The power management circuit 470 may supply power to components included in the electronic device 400. For example, the power management circuit 470 may supply power to the first and second communication circuits 110 and 130. In some cases, the power management circuit 470 may also supply power to the third communication circuit 150.

For example, the power management circuit 470 may receive power from a battery included in the electronic device 400. Alternatively, the power management circuit 470 may receive power from an external power source connected to the electronic device 400. The power manager circuit 470 may include any power-related circuit, such as a rectifier, a regulator, and/or the like, to properly convert the received power. The power management circuit 470 may output power that is suitable to operate each of components included in the electronic device 400 by properly converting the power provided from a battery or an external power source.

Each of the first and second communication circuit 110 and 130 may operate using the power supplied from the power management circuit 470. The first communication circuit 110 may transfer power to the first memory card 101 by means of the power supplied from the power management circuit 470. The second communication circuit 130 may transfer power to the second memory card 102 by means of the power supplied from the power management circuit 470.

For example, the power management circuit 470 may be implemented in an integrated circuit. The power management circuit 470 may be implemented with an integrated circuit that is provided separately from other components of the electronic device 400. Alternatively, the power management circuit 470 may be embedded in the electronic device 400.

Figure 12:
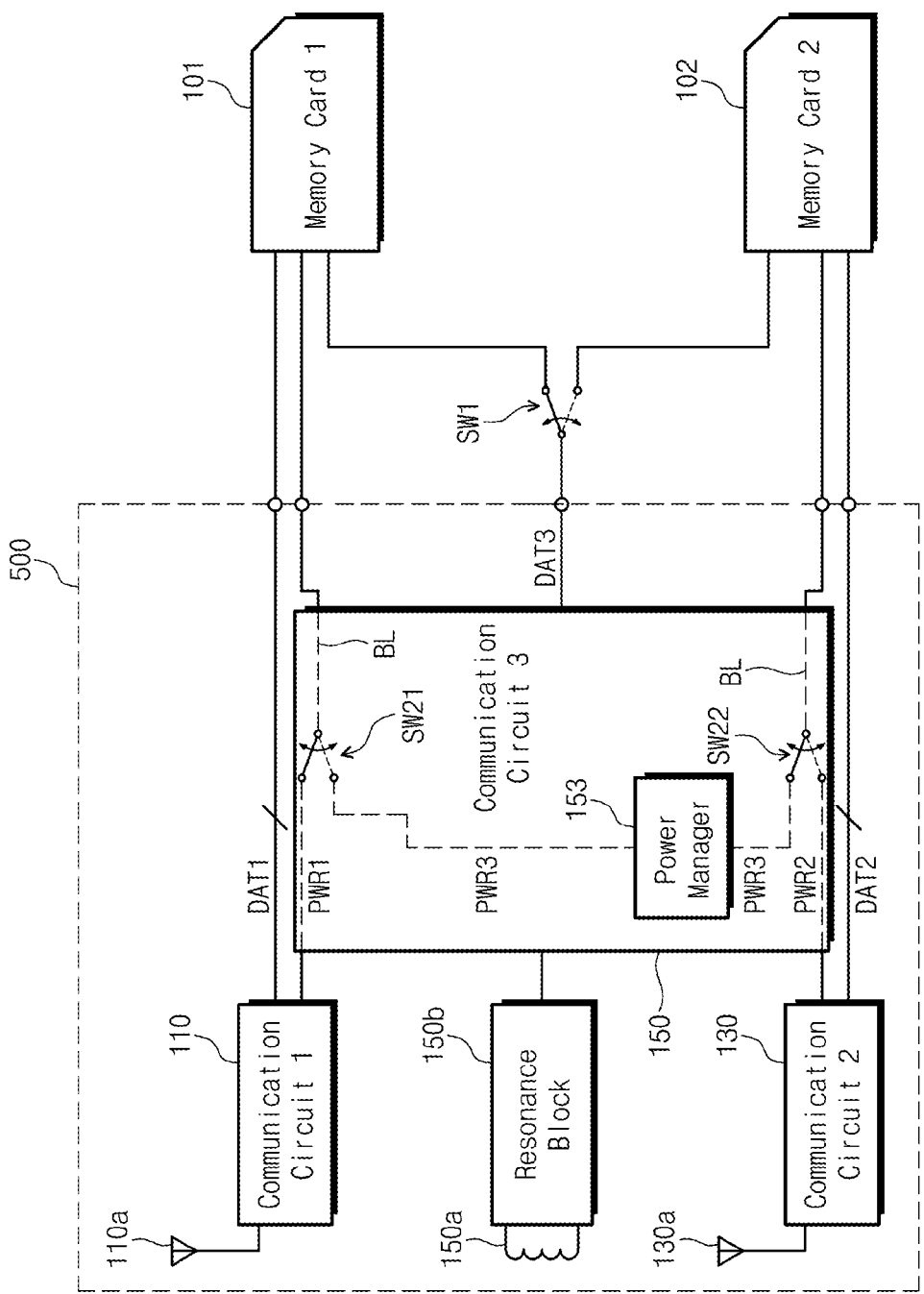
FIG. 12 is a block diagram illustrating an example configuration of an electronic device of FIG. 3.

FIG. 12 is a block diagram illustrating an example configuration of an electronic device of FIG. 3.

An electronic device 500 may include a first communication circuit 110, a second communication circuit 130, and a third communication circuit 150.

The electronic device 500 may be connected and may communicate with a plurality of memory cards 101 and 102 through switches SW1, SW21, and SW22. Configurations and operations of the first communication circuit 110, the second communication circuit 130, the antennas 110*a* and 130*a*, the third communication circuit 150, the inductive antenna 150*a*, and the resonance block 150*b* have been described with reference to FIGS. 3 to 8, thus redundant descriptions will be omitted below for brevity.

The first and second communication circuits 110 and 130 may be connected to the first and second memory cards 101 and 102, respectively. When being activated, each of the first and second communication circuits 110 and 130 may transfer power to a memory card connected thereto.

In some example embodiments, as illustrated in FIGS. 3 to 8, lines used to transfer the powers PWR1 and PWR2 from the communication circuits 110 and 130 to the memory cards 101 and 102 may be independently provided. On the other hand, in some example embodiments, as illustrated in FIG. 12, lines used to transfer the powers PWR1 and PWR2 from the communication circuits 110 and 130 to the memory cards 101 and 102 may bypass the third communication circuit 150.

In the example embodiment of FIG. 12, the third communication circuit 150 may include bypass lines BLs for the powers PWR1 and PWR2. When the first communication circuit 110 is activated, the first communication circuit 110 may transfer the power PWR1 to the first memory card 101 through the bypass line BL that bypasses the third communication circuit 150. When the second communication circuit 130 is activated, the second communication circuit 130 may transfer the power PWR2 to the second memory card 102 through the bypass line BL that bypasses the third communication circuit 150.

In the example embodiment of FIG. 12, the switch SW21 may selectively pass one of the power PWR1 transferred from the first communication circuit 110 and the power PWR3 transferred from power manager 153 of the third communication circuit 150 for the first memory card 101. For example, when the first communication circuit 110 is not activated, the third communication circuit 150 may transfer the power PWR3 to the first memory card 101 through the switch SW21 to communicate with the first memory card 101. For example, the switch SW21 may be controlled by the switch control signal SWC (refer to FIG. 3).

Furthermore, the switch SW22 may selectively pass one of the power PWR2 transferred from the second communication circuit 130 and the power PWR3 transferred from power manager 153 to the second memory card 102. For example, when the second communication circuit 130 is not activated, the third communication circuit 150 may transfer the power PWR3 to the second memory card 102 through the switch SW22 to communicate with the second memory card 102. For example, the switch SW22 may be controlled by the switch control signal SWC.

In the example embodiment of FIG. 12, it has been described that the switch SW1 is divided from the switches SW21 and SW22. However, in some example embodiment, the switches SW1, SW21, and SW22 may be included in one single switch circuit (e.g., such as the switch circuit 105 of FIG. 3). In some example embodiments, as illustrated in FIG. 10, the switches SW1, SW21, and SW22 may be included in the third communication circuit 150. FIG. 12 is not intended to limit the present disclosure, and is provided to help better understanding.

As illustrated in FIG. 12, when the bypass lines BLs are employed instead of independently providing lines used to transfer the powers PWR1 and PWR2, a total area occupied by a circuit may decrease and efficiency of line patterning may be improved. Furthermore, integration and design efficiency may be improved by utilizing a metal layer that is not used in the third communication circuit 150. In addition, a monitoring operation that will be described with reference to FIGS. 13 and 14 may be easily performed.

Figure 13:
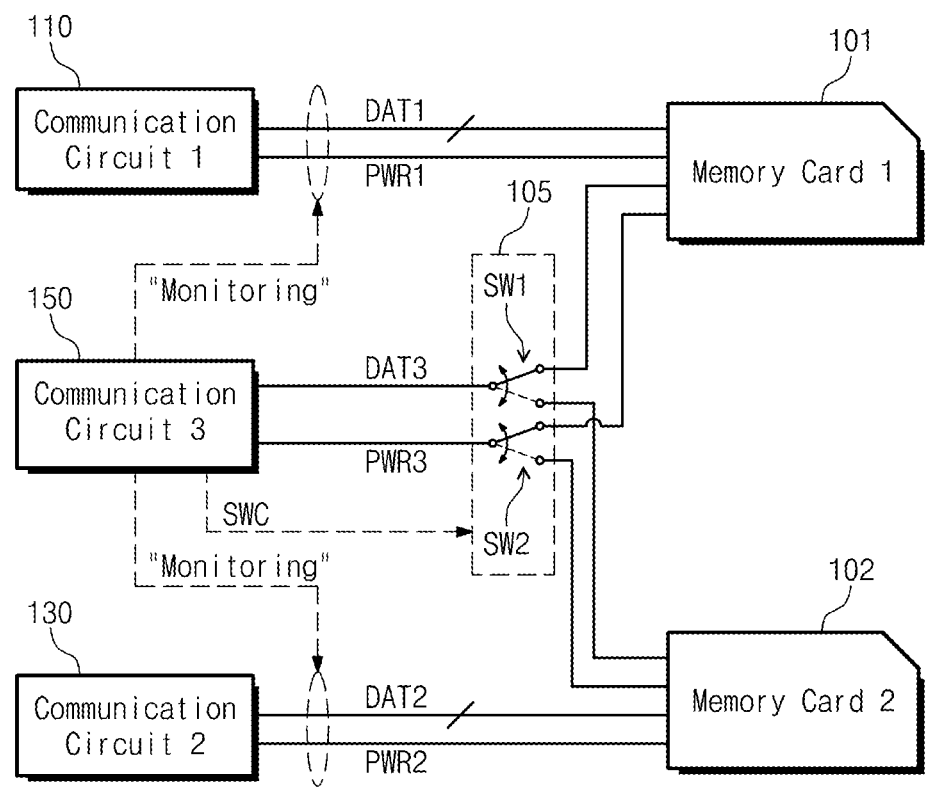
FIG. 13 is a conceptual diagram for describing an example operation of a third communication circuit of FIG. 3.

FIG. 13 is a conceptual diagram for describing an example operation of a third communication circuit of FIG. 3.

Referring to FIGS. 6, 7 and 13, the third communication circuit 150 may perform a "monitoring" operation. In more detail, the third communication circuit 150 may monitor whether the first communication circuit 110 transfers the power PWR1 to the first memory card 101 and/or whether the first communication circuit 110 exchanges the data DAT1 with the first memory card 101. In addition, the third communication circuit 150 may monitor whether the second communication circuit 130 transfers the power PWR2 to the second memory card 102 and/or whether the second communication circuit 130 exchanges the data DAT2 with the second memory card 102. For example, as illustrated in FIG. 6, the controller 151 included in the third communication circuit 150 may control the monitoring operation.

As described with reference to FIG. 7, in operation S140, the third communication circuit 150 may determine whether a specific memory card is connected to an activated communication circuit. To this end, the third communication circuit 150 may monitor whether the powers PWR1 and PWR2 are transferred. In some example embodiments, the third communication circuit 150 may include a voltage measurement circuit and/or a current measurement circuit to check the power being transferred.

For example, when the third communication circuit 150 recognizes that the first communication circuit 110 transfers the power PWR1 to the first memory card 101 during the monitoring operation, the third communication circuit 150 may determine the first communication circuit 110 as an activated communication circuit. Furthermore, the third communication circuit 150 may determine the first memory card 101 as being connected to the activated communication circuit.

For example, when the third communication circuit 150 recognizes that the second communication circuit 130 transfers the power PWR2 to the second memory card 102 during the monitoring operation, the third communication circuit 150 may determine the second communication circuit 130 as an activated communication circuit. Furthermore, the third communication circuit 150 may determine the second memory card 102 as being connected to the activated communication circuit.

In some cases, a connection between the first communication circuit 110 and the first memory card 101 may be initialized or a connection between the second communication circuit 130 and the second memory card 102 may be initialized. For example, while the first communication circuit 110 and the first memory card 101 operate, an error may occur in the operation of the first communication circuit 110 or in a communication between the first communication circuit 110 and the first memory card 101. In such an example, to solve the error, the connection between the first communication circuit 110 and the first memory card 101 may be initialized.

For example, to initialize the connection between the first communication circuit 110 and the first memory card 101, the operation of the first memory card 101 may be reset. When the operation of the first memory card 101 is reset, a connection between the third communication circuit 150 and the first memory card 101 may also be initialized. Accordingly, the third communication circuit 150 may be configured to recognize whether the operation of the first memory card 101 is reset.

In some example embodiments, the third communication circuit 150 may monitor whether the first communication circuit 110 transfers the power PWR1 to the first memory card 101. For example, when transferring the power PWR1 is interrupted and resumed while the first communication circuit 110 is activated, the connection between the first communication circuit 110 and the first memory card 101 may be initialized. Accordingly, when the third communication circuit 150 recognizes that transferring the power PWR1 is interrupted and resumed, the third communication circuit 150 may determine that the operation of the first memory card 101 is reset. In such a case, the third communication circuit 150 may initialize the connection with the first memory card 101 (i.e., the connection between the third communication circuit 150 and the first memory card 101).

For another example, the third communication circuit 150 may monitor the data DAT1 exchanged between the first communication circuit 110 and the first memory card 101. For example, the third communication circuit 150 may monitor whether the first communication circuit 110 transmits a reset signal to the first memory card 101. For example, the reset signal may be designed to have a specifically recognizable signal pattern. For another example, a plurality of data lines may be provided for the data DAT1, and at least one of the data lines may be allocated to transmit the reset signal. In some example embodiments, the third communication circuit 150 may include a signal detection circuit to detect the reset signal.

For example, when the first communication circuit 110 transmits the reset signal to the first memory card 101 while the first communication circuit 110 is activated, the operation of the first memory card 101 may be reset and the connection between the first communication circuit 110 and the first memory card 101 may be initialized. Accordingly, when the third communication circuit 150 recognizes transmitting the reset signal, the third communication circuit 150 may determine that the operation of the first memory card 101 is reset. In such a case, the third communication circuit 150 may initialize the connection with the first memory card 101.

An operation to initialize the connection with the first memory card 101 has been provided as an example. However, the above descriptions may be similarly applied to an operation to initialize a connection with the second memory card 102. The above example embodiments are provided to help better understanding, and are not intended to limit the present disclosure. The operation of the third communication circuit 150 according to the example embodiments may be variously changed or modified.

Figure 14:
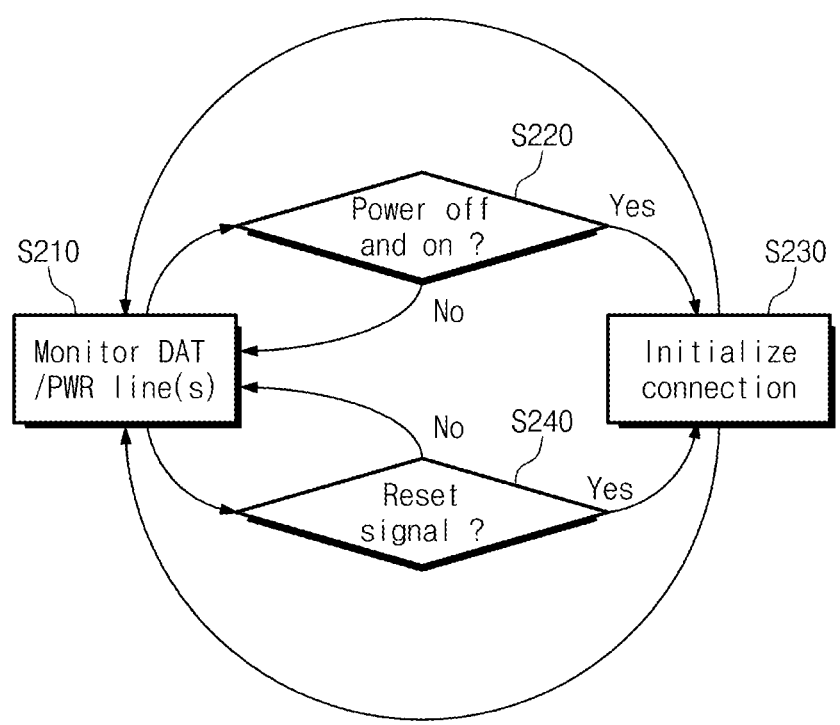
FIG. 14 is a state diagram describing an example operation of a third communication circuit of FIG. 3.

FIG. 14 is a state diagram describing an example operation of a third communication circuit of FIG. 3.

Referring to FIGS. 13 and 14, in operation S210, the third communication circuit 150 may monitor lines used to exchange the data DAT1 and DAT2 and/or lines used to transfer the power PWR1 and PWR2.

In operation S220, the third communication circuit 150 may determine whether power supply for a memory card connected to an activated communication circuit is interrupted and resumed. When the power supply for the memory card connected to the activated communication circuit is interrupted and resumed, operation S230 may be performed.

In operation S240, the third communication circuit 150 may determine whether a reset signal is transmitted to the memory card connected to the activated communication circuit. After the reset signal is transmitted to the memory card connected to the activated communication circuit, operation S230 may be performed.

In operation S230, the third communication circuit 150 may initialize a connection between the third communication circuit 150 and the memory card connected to the activated communication circuit. After the connection is initialized, the third communication circuit 150 may repeat the monitoring operation in operation S210.

When the power supply for the memory card connected to the activated communication circuit is not interrupted, the third communication circuit 150 may continuously perform the monitoring operation in operation S210. Furthermore, when the reset signal is not transmitted to the memory card connected to the activated communication circuit, the third communication circuit 150 may continuously perform a monitoring operation in operation S210.

Figure 15:
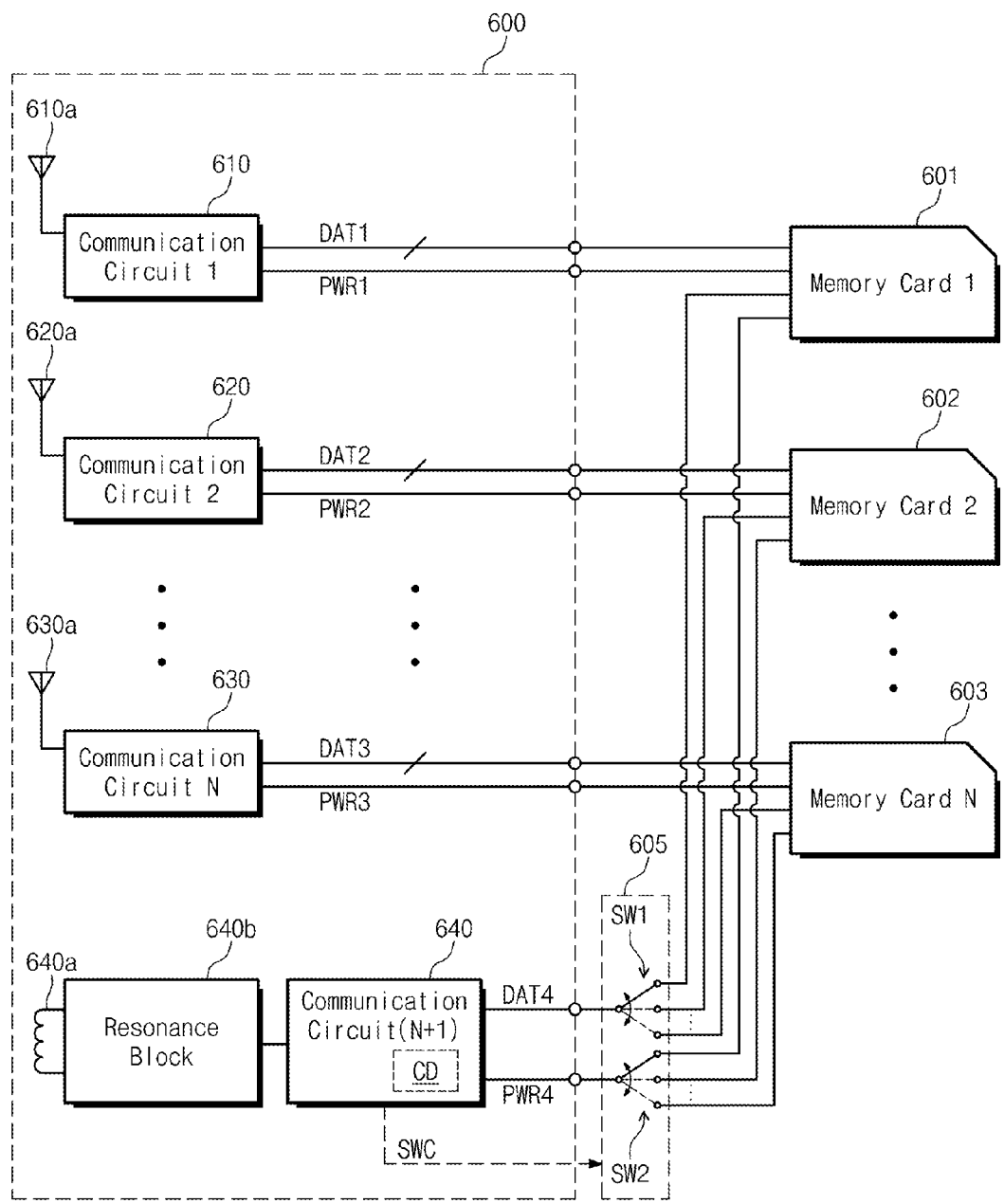
FIG. 15 is a block diagram illustrating connections between an electronic device according to the example embodiments and a plurality of memory cards.

FIG. 15 is a block diagram illustrating connections between an electronic device according to the example embodiments and a plurality of memory cards according to another example embodiment.

Referring to FIG. 15, an electronic device 600 may include first to N$^{th}$ communication circuits 610, 620 and 630, and a (N+1)$^{th}$ communication circuit 640 (where N is an integer greater than 2). For example, the electronic device 600 may be a portable device, such as a mobile communication device, a digital camera, a smart phone, a tablet computer, a notebook computer, and/or the like, but the present disclosure is not limited thereto. The electronic device 600 may be connected and may communicate with a plurality of memory cards 601, 602 and 603.

Each of the first to N$^{th}$ communication circuits 610, 620, and 630 may support a far-distance communication. The first to N$^{th}$ communication circuits 610, 620, and 630 may transmit and receive signals through antennas 610*a*, 620*a*, and 630*a*, respectively. The first to N$^{th}$ communication circuits 610, 620, and 630 may be connected with the first to N$^{th}$ memory cards 601, 602, and 603, respectively.

When the first communication circuit 610 is activated, the first communication circuit 610 may transfer the power PWR1 to the first memory card 601, and may exchange the data DAT1 with the first memory card 601. When the second communication circuit 620 is activated, the second communication circuit 620 may transfer the power PWR2 to the second memory card 602, and may exchange the data DAT2 with the second memory card 602. When the N$^{th}$ communication circuit 630 is activated, the N$^{th}$ communication circuit 630 may transfer the power PWR3 to the N$^{th}$ memory card 603, and may exchange the data DAT3 with the N$^{th}$ memory card 603.

Each of the first to N$^{th}$ communication circuits 610, 620 and 630 may be configured and may operate similarly to the first communication circuit 110 or the second communication circuit 130 described with reference to FIGS. 3 to 14. Each of the first to N$^{th}$ memory cards 601, 602 and 603 may be configured and may operate similarly to the first memory card 101 or the second memory card 102 described with reference to FIGS. 3 to 14. For brevity, redundant descriptions associated with the first to N$^{th}$ communication circuits 610, 620 and 630 and the first to N$^{th}$ memory cards 601, 602, and 630 will be omitted below.

As described with reference to FIG. 3, the electronic device 100 may include the first communication circuit 110 and the second communication circuit 130. Furthermore, the electronic device 100 may be connected and may communicate with the first and second memory cards 101 and 102. However, in FIG. 3, the number of communication circuits and the number of memory cards is provided to help better understanding, and is not intended to limit the example embodiments. For example, as illustrated in FIG. 15, the number of communication circuits and the number of memory cards may be variously changed or modified.

The (N+1)$^{th}$ communication circuit 640 may support a near-distance communication. The (N+1)$^{th}$ communication circuit 640 may transmit or receive a signal through an inductive antenna 640*a* and a resonance block 640*b*.

The (N+1)$^{th}$ communication circuit 640 may store the content data CD including information associated with content of data stored in the first to N$^{th}$ memory cards 601, 602, and 603. The (N+1)$^{th}$ communication circuit 640 may communicate with the first and N$^{th}$ memory cards 601, 602, and 603. In the example embodiments, the (N+1)$^{th}$ communication circuit 640 may select a memory card that is to communicate with the (N+1)$^{th}$ communication circuit 640, with reference to the content data CD.

The (N+1)$^{th}$ communication circuit 640 may output the switch control signal SWC for communicating with the selected memory card. The switch circuit 605 may connect the selected memory card with the (N+1)$^{th}$ communication circuit 640 in response to the switch control signal SWC.

The (N+1)$^{th}$ communication circuit 640 may exchange the data DAT4 with the selected memory card through the switch SW1. When the selected memory card is connected to a deactivated communication circuit and is not powered, the (N+1)$^{th}$ communication circuit 640 may transfer power PWR4 to the selected memory card through the switch SW2.

The (N+1)$^{th}$ electronic device 640 may be configured and may operate similarly to the third communication circuit 150, 250, or 350 described with reference to FIGS. 3 to 14. The switch circuit 605 may be configured and may operate similarly to the switch circuit 105 or 357 described with reference to FIGS. 3 to 14. For brevity, redundant descriptions associated with the (N+1)$^{th}$ communication circuit 640 and the switch circuit 605 will be omitted below.

Figure 16:
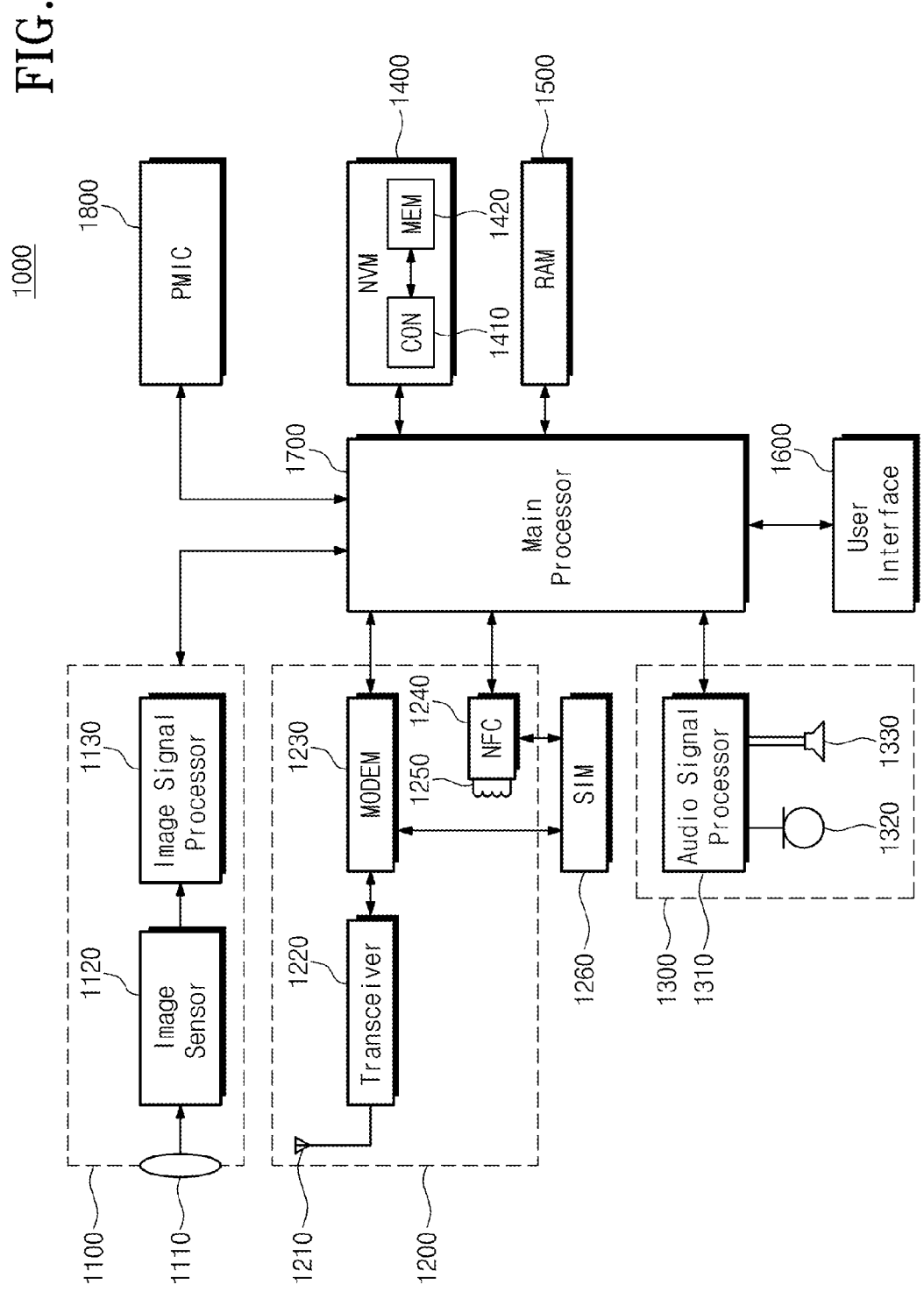
FIG. 16 is a block diagram illustrating a portable electronic device, that includes communication circuits according to the example embodiments, and a memory card connected thereto.

FIG. 16 is a block diagram illustrating a portable electronic device, that includes communication circuits according to the example embodiments, and a memory card connected thereto.

Referring to FIG. 16, a portable electronic device 1000 may include an image processor 1100, a wireless communication block 1200, an audio processor 1300, a nonvolatile memory 1400, a RAM 1500, a user interface 1600, a main processor 1700, and a power management circuit 1800. For example, the portable electronic device 1000 may be an electronic device such as a mobile communication terminal, a portable digital assistant (PDA), a personal media player (PMP), a digital camera, a smart phone, a notebook computer, a tablet computer, a wearable device, and/or the like.

The image processor 1100 may receive light through a lens 1110. An image sensor 1120 and an image signal processor 1130 included in the image processor 1100 may generate an image based on the light received through the lens 1110.

The wireless communication block 1200 may include an antenna 1210, a transceiver 1220, a modulator/demodulator (MODEM) 1230, a NFC circuit 1240, and an inductive antenna 1250. The MODEM 1230 may communicate with an external device or system of the portable electronic device 1000 in compliance with at least one of various wireless communication protocols, such as GSM, CDMA, WCDMA, HSPA, EV-DO, WiMax, WiBro, LTE, and/or the like. The MODEM 1230 may transmit and receive a signal through the antenna 1210 and the transceiver 1220. The NFC circuit 1240 may perform a near-distance communication through the inductive antenna 1250.

The MODEM 1230 and the NFC circuit 1240 may be connected to a SIM 1260. The SIM 1260 may include a plurality of memory cards. The MODEM 1230 may include a plurality of communication circuits respectively connected to the plurality of memory cards included in the SIM 1260. The MODEM 1230 and the NFC circuit 1240 may communicate with the plurality of memory cards included in the SIM 1260.

The MODEM 1230, the NFC circuit 1240, and the SIM 1260 may be implemented according to the example embodiments described with reference to FIGS. 3 to 15. For example, the MODEM 1230 may include the first and third communication circuits 110, 130, the NFC circuit 1240 may include the second communication circuit 120, and the SIM 1260 may include the first and second memory cards 101, 102.

When being activated, each of the plurality of communication circuits included in the MODEM 1230 may transfer power to and communicate with the memory card connected thereto. The NFC circuit 1240 may transfer power to a memory card connected to a deactivated communication circuit to communicate with the memory card connected to the deactivated communication circuit.

According to the example embodiments, data stored in the memory card connected to the deactivated communication circuit may be read and output. Accordingly, the scope of services provided to a user of the portable electronic device 1000 may be expanded, and the convenience of a user may be improved. For brevity, redundant descriptions for the example embodiments will be omitted below.

The audio processor 1300 may process an audio signal by means of an audio signal processor 1310. The audio processor 1300 may receive an audio input through a microphone 1320, or may provide an audio output through a speaker 1330.

The nonvolatile memory 1400 may store data required to be stored regardless of power supply. For example, the nonvolatile memory 1400 may include at least one of a flash memory, a PRAM, an MRAM, a ReRAM, a FRAM, and/or the like. Under control of a memory controller 1410, a memory device 1420 may store data or may output data.

The RAM 1500 may store data used in an operation of the portable electronic device 1000. For example, the RAM 1500 may be used as a working memory, an operation memory, or a buffer memory of the portable electronic device 1000. The RAM 1500 may temporarily store data processed or to be processed by the main processor 1700.

The user interface 1600 may process interfacing between a user and the portable electronic device 1000 under control of the main processor 1700. For example, the user interface 1600 may include an input interface, such as a keyboard, a keypad, a button, a touch panel, a touch screen, a touch pad, a touch ball, a camera, a microphone, a gyroscope sensor, a vibration sensor, and/or the like. For example, the user interface 1600 may include an output interface, such as a display device, a motor, and/or the like. For example, the display device may include at least one of a liquid crystal display (LCD), a light emitting diode (LED) display, an organic LED (OLED) display, an active matrix OLED (AMOLED) display, and/or the like.

The main processor 1700 may control the overall operations of the portable electronic device 1000.

The image processor 1100, the wireless communication block 1200, the audio processor 1300, the nonvolatile memory 1400, and the RAM 1500 may perform a user command provided through the user interface 1600 under control of the main processor 1700. The image processor 1100, the wireless communication block 1200, the audio processor 1300, the nonvolatile memory 1400, and the RAM 1500 may provide a service to a user through the user interface 1600 under control of the main processor 1700. The main processor 1700 may be implemented with a system-on-chip (SoC). For example, the main processor 1700 may include an application processor. For another example, the main processor 1700 may include a general-purposed processor.

The power management circuit 1800 may manage power used in an operation of the portable electronic device 1000. For example, the power management circuit 1800 may properly convert power provided from a battery or an external power source. Furthermore, the PMIC 1800 may provide the converted power to components of the portable electronic device 1000. For example, the MODEM 1230 and the NFC 1240 may receive power from the power management circuit 1800.

According to the example embodiments, data stored in a deactivated memory card may be read. Accordingly, the scope of services provided to a user of an electronic device may be expanded, and the convenience of a user may be improved.

What is claimed is:

1. A communication circuit chip comprising:
   a power manager configured to transfer power, based on a reception signal, to a selected memory card, which is deactivated, among first and second memory cards;
   a memory configured to store content data including information on data stored in the first and second memory cards; and
   a controller configured to,
      collect the content data and store the content data in the memory, if connections with the first and second memory cards are initialized,
      select the selected memory card based on the reception signal and the content data, and
      communicate with the selected memory card based on the reception signal.

2. The communication circuit chip of claim 1, wherein the reception signal includes an access request to access data stored in the selected memory card.

3. The communication circuit chip of claim 1, wherein the content data includes information associated with content of data stored in each of the first and second memory cards.

4. An electronic device comprising:
first and second communication circuits connected to first and second memory cards, respectively, a first one of the first and second communication circuits being an activated communication circuit configured to communicate with an activated memory card among the first and second memory cards, and a second one of the first and second communication circuits being a deactivated communication circuit configured to not communicate with a deactivated memory card among the first and second memory cards; and
a third communication circuit configured to communicate with a selected memory card, which is deactivated, among the first and second memory cards, based on a reception signal received through an antenna such that, when an access to the deactivated memory card is requested, the third communication circuit is configured to transfer power to the deactivated memory card to communicate with the deactivated memory card.

5. The electronic device of claim 4, wherein the activated communication circuit is configured to store communication use data in the activated memory card connected to the activated communication circuit, the communication use data being generated based on communication with an external device.

6. The electronic device of claim 4, wherein the deactivated communication circuit is configured not to communicate with the deactivated memory card connected to the deactivated communication circuit.

7. The electronic device of claim 4, wherein the third communication circuit is further configured to collect content data associated with content of data stored in each of the first and second memory cards, if a connection between the third communication circuit and the first memory card and a connection between the third communication circuit and the second memory card are initialized.

8. The electronic device of claim 7, wherein the third communication circuit comprises:
a memory configured to store the content data.

9. The electronic device of claim 7, wherein the third communication circuit is further configured to communicate with one of the first and second memory cards based on the content data.

10. The electronic device of claim 4, wherein the third communication circuit is further configured to monitor whether the first and second communication circuits transmit reset signals to the first and second memory cards, respectively.

11. The electronic device of claim 4, wherein the third communication circuit is further configured to initialize a connection with the activated memory card connected to the activated communication circuit, after the activated communication circuit transmits a reset signal to the activated memory card.

12. An auxiliary communication device, comprising:
a memory configured to store content data including information associated with data stored in a plurality of memory cards, each of the plurality of memory cards configured to selectively receive power from a respective one of primary communication devices, if the respective one of the primary communication devices is an activated communication device; and
a controller configured to establish an auxiliary link with a selected memory card, which is deactivated, of the plurality of memory cards based on a reception signal and the content data such that the selected memory card, which is deactivated, is accessible irrespective of whether the respective one of the primary communication devices connected to the selected memory card is the activated communication device.

13. The auxiliary communication device of claim 12, further comprising:
a power supply configured to generate auxiliary power, wherein
the controller is configured to instruct the power supply to supply the auxiliary power to the selected memory card, which is deactivated.

14. The auxiliary communication device of claim 13, wherein the power supply is configured to generate the auxiliary power using a current included in the reception signal.

15. The auxiliary communication device of claim 12, wherein the controller is configured to instruct a switch to connect the auxiliary link and the selected memory card via a switch control signal.

16. The auxiliary communication device of claim 15, further comprising:
the switch configured to switch the auxiliary link and the selected memory card based on the switch control signal.

17. The auxiliary communication device of claim 12, wherein the controller is configured to communicate with an external device via an inductive antenna.

18. The auxiliary communication device of claim 12, wherein the activated communication device is one of the primary communication devices supplying power to a respective one of the plurality of memory cards connected to the activated communication device.

* * * * *